US009801200B2

(12) United States Patent
Quan et al.

(10) Patent No.: US 9,801,200 B2
(45) Date of Patent: Oct. 24, 2017

(54) SCHEDULING METHOD, BASE STATION, USER EQUIPMENT, AND SYSTEM

(71) Applicant: Huawei Technologies Co., Ltd., Shenzhen (CN)

(72) Inventors: Wei Quan, Beijing (CN); Jian Zhang, Beijing (CN); Yi Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 169 days.

(21) Appl. No.: 14/660,527

(22) Filed: Mar. 17, 2015

(65) Prior Publication Data
US 2015/0195850 A1   Jul. 9, 2015

Related U.S. Application Data

(63) Continuation of application No. PCT/CN2012/081507, filed on Sep. 17, 2012.

(51) Int. Cl.
*H04W 4/00*   (2009.01)
*H04W 72/12*   (2009.01)
*H04L 1/18*   (2006.01)
*H04W 72/04*   (2009.01)

(52) U.S. Cl.
CPC .......... *H04W 72/1236* (2013.01); *H04L 1/18* (2013.01); *H04L 1/1861* (2013.01); *H04W 72/04* (2013.01); *H04W 72/1284* (2013.01)

(58) Field of Classification Search
USPC ....... 370/229, 230, 235, 236, 252, 328, 329, 370/412
See application file for complete search history.

(56) References Cited

U.S. PATENT DOCUMENTS

| | | | |
|---|---|---|---|
| 8,639,997 B2* | 1/2014 | Damnjanovic | H04L 1/188 714/748 |
| 8,767,614 B2* | 7/2014 | Du | H04L 47/14 370/315 |
| 2001/0046240 A1* | 11/2001 | Longoni | H04B 7/2681 370/503 |
| 2005/0085227 A1* | 4/2005 | Nishimura | H04W 36/18 455/428 |

(Continued)

FOREIGN PATENT DOCUMENTS

| | | |
|---|---|---|
| CN | 101257371 A | 9/2008 |
| CN | 101557581 A | 10/2009 |

(Continued)

*Primary Examiner* — Kwang B Yao
*Assistant Examiner* — Nguyen Ngo
(74) *Attorney, Agent, or Firm* — Leydig, Voit & Mayer, Ltd.

(57) ABSTRACT

Embodiments of the present invention relate to a scheduling method, a base station, a user equipment, and a system. The method includes: configuring, by a base station, a HARQ parameter for a UE according to a QoS requirement; sending, by the base station, the HARQ parameter to the UE; receiving, by the base station, a BSR that is sent by the UE according to the HARQ parameter; allocating, by the base station, a first uplink transmission resource to the UE according to the BSR, and scheduling the first uplink transmission resource for the UE; and receiving, by the base station, uplink transmitted data that is sent by the UE by using the first uplink transmission resource.

20 Claims, 17 Drawing Sheets

(56) References Cited

U.S. PATENT DOCUMENTS

| | | | |
|---|---|---|---|
| 2008/0226074 A1* | 9/2008 | Sammour | H04W 12/04 380/270 |
| 2009/0034507 A1* | 2/2009 | Chang | H04L 63/0428 370/349 |
| 2010/0322098 A1* | 12/2010 | Pelletier | H04W 72/1252 370/252 |
| 2011/0143801 A1* | 6/2011 | Bucknell | H04L 1/1874 455/514 |
| 2011/0243014 A1* | 10/2011 | Lee | H04L 1/1864 370/252 |
| 2012/0057547 A1* | 3/2012 | Lohr | H04L 5/0007 370/329 |
| 2012/0149298 A1* | 6/2012 | Jiang | H04W 72/1252 455/7 |
| 2012/0314672 A1* | 12/2012 | Chen | H04W 74/002 370/329 |
| 2015/0092542 A1* | 4/2015 | Yang | H04W 28/0268 370/230 |

FOREIGN PATENT DOCUMENTS

| | | |
|---|---|---|
| CN | 101998621 A | 3/2011 |
| WO | 2012044328 A1 | 4/2012 |

* cited by examiner

SCHEDULING METHOD, BASE STATION, USER EQUIPMENT, AND SYSTEM

CROSS-REFERENCE

This application is a continuation of International Patent Application No. PCT/CN2012/081507, filed Sep. 17, 2012, which is hereby incorporated by reference in its entirety.

TECHNICAL FIELD

The present invention relates to the field of mobile communications, and in particular, to a scheduling method, a base station, a user equipment, and a system.

BACKGROUND

FIG. 1 is a schematic diagram of a Long Term Evolution (Long Term Evolution, LTE) radio access network (Radio Access Network, RAN) user plane (User Plane, UP) protocol stack in the prior art.

A packet data convergence protocol (Packet Data Convergence Protocol, PDCP) layer is mainly responsible for functions such as header compression, ciphering/deciphering, integrity protection, PDCP sequence number (Sequence Number, SN) maintenance, and in-sequence delivery.

A radio link control (Radio Link Control, RLC) layer is mainly responsible for functions such as data error detection, reordering, data concatenation, segmentation and re-segmentation, and duplicate detection by using an Automatic Repeat Request (Automatic Repeat reQuest, ARQ) mechanism.

A medium access control (Medium Access Control, MAC) layer is mainly responsible for functions such as mapping of logical channels to transport channels, a logical channel prioritization (Logical Channel Prioritization, LCP) procedure, error detection by using a hybrid automatic repeat request (Hybrid Automatic Repeat reQuest, HARQ) mechanism, and reporting of scheduling information.

With the continuous increase of mobile applications, many mobile services focusing on small packets emerge. For such small packets, the foregoing protocol architecture has the following problems:

In the existing architecture, for a data packet that enters an LTE RAN, first, a PDCP SN of 7 or 12 bits is added at the PDCP layer, and then after a PDCP protocol data unit (Protocol Data Unit, PDU) enters the RLC layer, concatenation or segmentation is performed, and in an unacknowledged mode (Unacknowledged Mode, UM), an RLC SN of 5 or 12 bits is further added to each RLC PDU, while in an acknowledged mode (Acknowledged Mode, AM), an RLC SN of 12 bits is further added to each RLC PDU. As a result, for a small packet, resource utilization is apparently reduced.

SUMMARY

Embodiments of the present invention provide a scheduling method and apparatus, which may reduce complexity of a protocol stack according to an optimized protocol stack and reduce an overhead.

According to a first aspect, an embodiment of the present invention provides a scheduling method, where the method includes:

configuring, by a base station, a Hybrid Automatic Repeat Request HARQ parameter for a user equipment UE according to a quality of service QoS requirement;

sending, by the base station, the HARQ parameter to the UE;

receiving, by the base station, a buffer status report BSR that is sent by the UE according to the HARQ parameter;

allocating, by the base station, a first uplink transmission resource to the UE according to the BSR, and scheduling the first uplink transmission resource for the UE; and receiving, by the base station, uplink transmitted data that is sent by the UE by using the first uplink transmission resource.

According to a second aspect, an embodiment of the present invention provides a scheduling method, where the method includes:

receiving, by a UE, a HARQ parameter that is configured by a base station according to a QoS requirement;

sending, by the UE, a BSR to the base station according to the HARQ parameter;

receiving, by the UE, an indication of a first uplink transmission resource that is allocated to the UE and scheduled by the base station;

determining, by the UE, a scheduled queue according to the indication, and scheduling uplink transmitted data in the queue; and sending, by the UE, the uplink transmitted data to the base station by using the first uplink transmission resource.

According to a third aspect, an embodiment of the present invention provides a base station, where the base station includes a configuring unit, a sending unit, a receiving unit, and an allocating unit, where:

the configuring unit is configured to configure a Hybrid Automatic Repeat Request HARQ parameter for a UE according to a quality of service QoS requirement, and send the HARQ parameter to the sending unit;

the sending unit is configured to send the HARQ parameter to the UE;

the receiving unit is configured to receive a buffer status report BSR that is sent by the UE according to the HARQ parameter, and send the BSR to the allocating unit;

the allocating unit is configured to allocate a first uplink transmission resource to the UE according to the BSR, and schedule the first uplink transmission resource for the UE; and the receiving unit is further configured to receive uplink transmitted data that is sent by the UE by using the first uplink transmission resource.

According to a fourth aspect, an embodiment of the present invention provides a user equipment, where the UE includes a receiving unit, a sending unit, and a scheduling unit, where:

the receiving unit is configured to receive a HARQ parameter that is configured by a base station according to a QoS requirement, and send the HARQ parameter to the sending unit;

the sending unit is configured to send a BSR to the base station according to the HARQ parameter;

the receiving unit is further configured to receive an indication of a first uplink transmission resource that is allocated to the UE and scheduled by the base station, and send the indication to the scheduling unit;

the scheduling unit is configured to determine a scheduled queue according to the indication, schedule uplink transmitted data in the queue, and send the uplink transmitted data to the sending unit; and the sending unit is further configured to send the uplink transmitted data to the base station by using the first uplink transmission resource.

According to a fifth aspect, an embodiment of the present invention provides a scheduling system, where the scheduling system includes:

a network interface;
a processor;
a memory; and
an application program physically stored in the memory, where the application program includes instructions that may be used to cause the processor and the system to execute the following procedures:

configuring, by a base station, a HARQ parameter for a UE according to a quality of service QoS requirement;
sending, by the base station, the HARQ parameter to the UE;
receiving, by the base station, a BSR that is sent by the UE according to the HARQ parameter;
allocating, by the base station, a first uplink transmission resource to the UE according to the BSR, and scheduling the first uplink transmission resource for the UE; and receiving, by the base station, uplink transmitted data that is sent by the UE by using the first uplink transmission resource.

According to a sixth aspect, an embodiment of the present invention provides a scheduling system, where the scheduling system includes:

a network interface;
a processor;
a memory; and
an application program physically stored in the memory, where the application program includes instructions that may be used to cause the processor and the system to execute the following procedures:

receiving, by a UE, a HARQ parameter that is configured by a base station according to a QoS requirement;
sending, by the UE, a BSR to the base station according to the HARQ parameter;
receiving, by the UE, an indication of a first uplink transmission resource that is allocated to the UE and scheduled by the base station;
determining, by the UE, a scheduled queue according to the indication, and scheduling uplink transmitted data in the queue; and
sending, by the UE, the uplink transmitted data to the base station by using the first uplink transmission resource.

By using the scheduling method, base station, user equipment, and system according to the embodiments of the present invention, the UE may send a BSR according to a HARQ parameter that is configured according to a QoS requirement, the base station allocates an uplink transmission resource to the UE according to the BSR, and the UE transmits uplink transmitted data to the base station according to the uplink transmission resource, thereby reducing a system overhead and improving the processing efficiency.

DESCRIPTION OF EMBODIMENTS

The technical solutions of the present invention are described in further detail below with reference to the accompanying drawings and embodiments.

To ensure completely lossless transmissions of some services in an LTE system, both a MAC layer and an RLC layer include an error detection procedure, where the MAC layer uses the HARQ protocol, while the RLC layer uses the ARQ protocol. However, due to use of the HARQ protocol, the ARQ protocol plays a very limited role, but complexity of implementation of the ARQ protocol and an overhead generated by the ARQ protocol have a great adverse impact on the system. Increasing a maximum number of HARQ retransmissions may also approximately achieve objectives of lossless transmissions of some services. However, because different services have different quality of service (Quality of Service, QoS) requirements of reliable transmissions, QoS requirements of different services cannot be handled discriminatively by using the same number of HARQ retransmissions.

Figure 1:
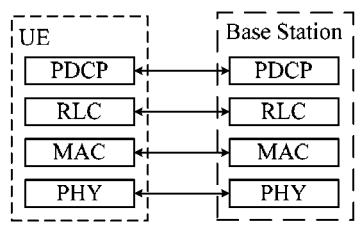
FIG. 1 is a schematic diagram of an LTE RAN UP protocol stack in the prior art.
Figure 2:
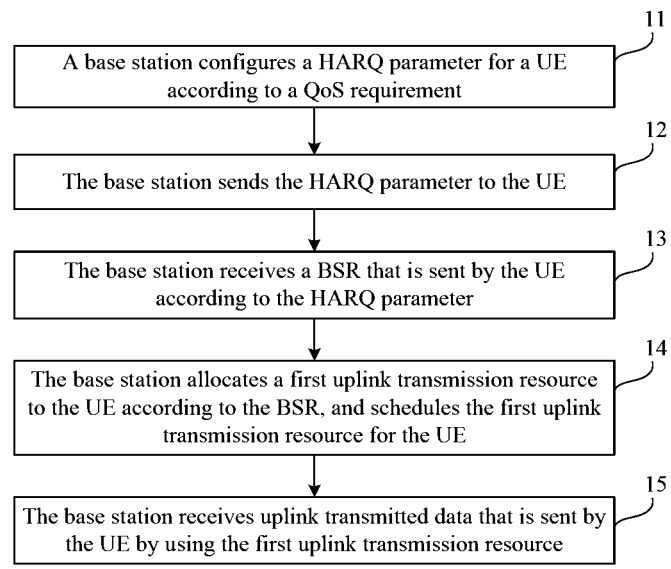
FIG. 2 is a flowchart of Embodiment 1 of a scheduling method according to the present invention.

FIG. 2 is a flowchart of Embodiment 1 of a scheduling method according to the present invention. As shown in the figure, this embodiment provides a scheduling method on a base station side, including:

Step 11: A base station configures a HARQ parameter for a user equipment (User Equipment, UE) according to a QoS requirement.

The QoS requirement may be obtained by the base station from a core network to which the user equipment belongs. An important QoS indicator is a reliability requirement. When the reliability requirement is high, a required maximum number of HARQ retransmissions is large; conversely, when the reliability requirement is low, a required maximum number of HARQ retransmissions is small.

Therefore, the base station configures the HARQ parameter for the UE according to a reliability requirement in the QoS requirement. Specifically, there are three manners:

1. Using a queue of the UE, the base station configures the HARQ parameter for the queue of the UE according to the reliability requirement in the QoS requirement. The queue of the UE may be one or more queues. When the UE has multiple queues, for each queue, the base station configures a HARQ parameter. Certainly, HARQ parameters of some queues may be the same. The HARQ parameter includes a maximum number of HARQ transmissions, or includes an uplink HARQ process number used by the queue of the UE and a maximum number of HARQ transmissions.

2. Using a queue group of the UE, the base station configures the HARQ parameter for the queue group of the UE according to the reliability requirement in the QoS requirement. The HARQ parameter includes a maximum number of HARQ transmissions, or includes a maximum number of HARQ transmissions and an uplink HARQ process number used by the queue group of the UE.

The queue group of the UE may be one or more queue groups. A principle for queue group allocation may be that all queues having a same maximum number of HARQ retransmissions are allocated as one queue group, and that the base station allocates a maximum number of HARQ transmissions or an uplink HARQ process number to the queue group.

3. Using an uplink HARQ process of the UE, the base station configures the HARQ parameter for the uplink HARQ process of the UE according to the reliability requirement in the QoS requirement. The HARQ parameter includes a maximum number of retransmissions of the uplink HARQ process, or includes a maximum number of retransmissions of the uplink HARQ process and a number of a queue or a queue group of the UE, where the queue or queue group uses the uplink HARQ process.

Step 12: The base station sends the HARQ parameter to the UE.

Step 13: The base station receives a buffer status report (Buffer Status Report, BSR) that is sent by the UE according to the HARQ parameter.

In addition, optionally, the base station first sends a MAC control element (Control Element, CE) to the UE to trigger the UE to send the BSR.

Specifically, the base station receives the BSR that is sent by the UE according to a unit of a queue, or a queue group, or a queue and a queue group of the UE defined in the HARQ parameter.

Step 14: The base station allocates a first uplink transmission resource to the UE according to the BSR, and schedules the first uplink transmission resource for the UE.

Specifically, according to the three cases of step 10 in which the base station configures the HARQ parameter for the UE according to the reliability requirement in the QoS requirement, there are also three corresponding manners in which the base station schedules the first uplink transmission resource for the UE.

1. Using the queue of the UE, the base station notifies, by using a physical downlink control channel (Physical Downlink Control Channel, PDCCH) indication, the UE of the first uplink transmission resource allocated to the queue of the UE.

2. Using the queue group of the UE, the base station notifies, by using a physical downlink control channel PDCCH indication, the UE of the first uplink transmission resource allocated to the queue group of the UE.

3. Using the uplink HARQ process of the UE, the base station notifies, by using a physical downlink control channel PDCCH indication, the UE of the first uplink transmission resource allocated to the uplink HARQ process of the UE.

The PDCCH indication includes two pieces of information. The first piece is the first uplink transmission resource, and the second piece is the queue or queue group or uplink HARQ process of the UE to which the first uplink transmission resource is allocated. In this way, the UE knows which first uplink transmission resource is allocated to the UE.

Step 15: The base station receives uplink transmitted data that is sent by the UE by using the first uplink transmission resource.

Specifically, the uplink transmitted data may be a ciphered MAC PDU; and step 15 is specifically that a MAC layer of the base station receives the ciphered MAC PDU that is sent by the UE by using the first uplink transmission resource.

Optionally, after step 15, this embodiment may further include:

Step 15a1: The MAC layer of the base station performs deciphering processing on the ciphered MAC PDU to obtain the MAC PDU.

Step 15b1: The MAC layer of the base station perform reordering processing on the MAC PDU; and specifically, perform reordering processing on the MAC PDU according to a MAC SN, a reordering timer, and a reordering window.

Step 15c1: Perform MAC header removal processing on the reordered MAC PDU, and then perform SDU reassembly to generate a MAC SDU.

Step 15d1: Send the MAC SDU to a non-access stratum of the base station.

Optionally, after step 15, this embodiment may further include:

Step 15a2: The MAC layer of the base station performs deciphering processing on the ciphered MAC PDU to obtain the deciphered MAC PDU.

Step 15b2: The MAC layer of the base station perform reordering processing on the MAC PDU; and specifically, perform reordering processing on the MAC PDU according to a MAC SN, a reordering timer, and a reordering window.

Step 15c2: Perform MAC header removal processing on the reordered MAC PDU to obtain a MAC SDU, where the MAC SDU includes an RLC PDU, and send the RLC PDU to a receiving RLC entity (for example, an O_UM-RLC entity) at an RLC layer of the base station according to an indication of a queue number of the RLC PDU, where the indication is carried in the MAC header.

Step 15d2: The receiving RLC entity performs RLC header (RLC Header) removal processing on the RLC PDU, and then performs disassembly or assembly processing to restore the RLC PDU to an RLC SDU.

Step 15e2: The receiving RLC entity send the RLC SDU to a PDCP layer of the base station.

In addition, in this embodiment, when the UE is handed over from the base station (namely, a source base station) to a target base station, the method further includes:

Step a1: When the UE is handed over from the base station to the target base station, the base station sends information in the uplink HARQ process and information in a downlink HARQ process to the target base station.

Step a2: After the UE accesses the target base station, the target base station receives status information of the downlink HARQ process reported by the UE.

Step a3: The target base station sends status information of the uplink HARQ process to the UE.

Step a4: The target base station performs downlink HARQ process synchronization with the UE according to the status information of the downlink HARQ process.

Specifically, the information in the uplink HARQ process includes the uplink HARQ process number, an uplink Medium Access Control sequence number MAC SN, and a size of a transport block TB corresponding to a MAC protocol data unit PDU; the information in the downlink HARQ process includes a downlink HARQ process number and a downlink MAC SN; the status information of the uplink HARQ process includes the uplink HARQ process number, the MAC SN, and an ACK/NACK; and the status information of the downlink HARQ process includes the downlink HARQ process number, the MAC SN, and an ACK/NACK.

Figure 3:
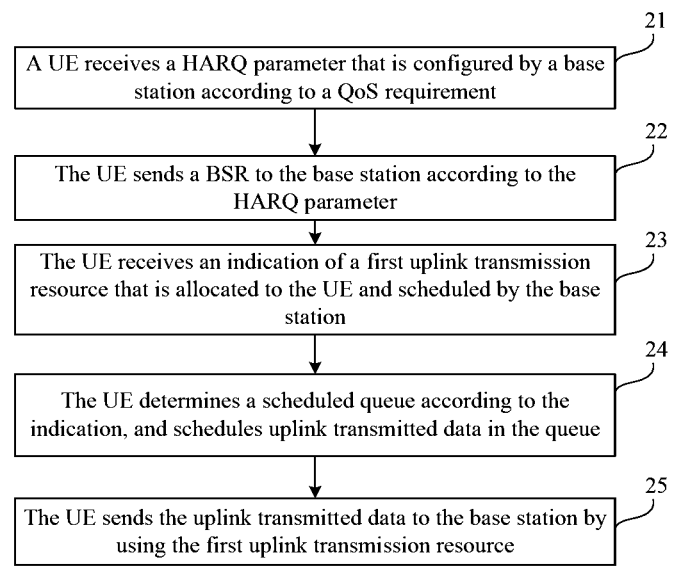
FIG. 3 is a flowchart of Embodiment 2 of a scheduling method according to the present invention.

FIG. 3 is a flowchart of Embodiment 2 of a scheduling method according to the present invention. As shown in the figure, this embodiment provides a scheduling method on a UE side, specifically including the following steps:

Step 21: A UE receives a HARQ parameter that is configured by a base station according to a QoS requirement.

An important QoS indicator is a reliability requirement. When the reliability requirement is high, a required maximum number of HARQ retransmissions is large; conversely, when the reliability requirement is low, a required maximum number of HARQ retransmissions is small.

Therefore, the base station configures the HARQ parameter for the UE according to a reliability requirement in the QoS requirement. Specifically, there are three manners:

1. Using a queue of the UE, the base station configures the HARQ parameter for the queue of the UE according to the reliability requirement in the QoS requirement. The queue of the UE may be one or more queues. When the UE has multiple queues, for each queue, the base station configures a HARQ parameter. Certainly, HARQ parameters of some queues may be the same. The HARQ parameter includes a maximum number of HARQ transmissions, or includes an uplink HARQ process number used by the queue of the UE and a maximum number of HARQ transmissions.

2. Using a queue group of the UE, the base station configures the HARQ parameter for the queue group of the UE according to the reliability requirement in the QoS requirement. The HARQ parameter includes a maximum number of HARQ transmissions, or includes a maximum number of HARQ transmissions and an uplink HARQ process number used by the queue group of the UE.

The queue group of the UE may be one or more queue groups. A principle for queue group allocation may be that all queues having a same maximum number of HARQ retransmissions are allocated as one queue group, and that the base station allocates a maximum number of HARQ transmissions or an uplink HARQ process number to the queue group.

3. Using an uplink HARQ process of the UE, the base station configures the HARQ parameter for the uplink HARQ process of the UE according to the reliability requirement in the QoS requirement. The HARQ parameter includes a maximum number of retransmissions of the uplink HARQ process, or includes a maximum number of retransmissions of the uplink HARQ process and a number of a queue or a queue group of the UE, where the queue or queue group uses the uplink HARQ process.

Step 22: The UE sends a BSR to the base station according to the HARQ parameter.

Optionally, the UE first receives a MAC CE sent by the base station, to trigger the UE to send the BSR.

Specifically, the UE sends the BSR to the base station according to a unit of a queue, a queue group, or a queue and a queue group of the UE defined in the HARQ parameter.

Step 23: The UE receives an indication of a first uplink transmission resource that is allocated to the UE and scheduled by the base station.

Specifically, according to the three cases of step 21 in which the base station configures the HARQ parameter for the UE according to the reliability requirement in the QoS requirement, there are also three corresponding manners in which the base station schedules the first uplink transmission resource for the UE.

1. Using the queue of the UE, the base station notifies, by using a physical downlink control channel (Physical Downlink Control Channel, PDCCH) indication, the UE of the first uplink transmission resource allocated to the queue of the UE.

2. Using the queue group of the UE, the base station notifies, by using a physical downlink control channel PDCCH indication, the UE of the first uplink transmission resource allocated to the queue group of the UE.

3. Using the uplink HARQ process of the UE, the base station notifies, by using a physical downlink control channel PDCCH indication, the UE of the first uplink transmission resource allocated to the uplink HARQ process of the UE.

The PDCCH indication includes two pieces of information. The first piece is the first uplink transmission resource, and the second piece is the queue or queue group or uplink HARQ process of the UE to which the first uplink transmission resource is allocated. In this way, the UE in the queue or queue group or uplink HARQ process of the UE knows which first uplink transmission resource is allocated to the UE.

Step 24: The UE determines a scheduled queue according to the indication, and schedules uplink transmitted data in the queue.

Step 25: The UE sends the uplink transmitted data to the base station by using the first uplink transmission resource.

Specifically, the uplink data may be a ciphered MAC PDU, and step 25 is specifically that a MAC layer of the UE sends the ciphered MAC PDU to the base station by using the first uplink transmission resource.

Optionally, after step 25, this embodiment may further include the following steps:

Step 25a1: The MAC layer of the UE performs header compression processing on user plane data received from a non-access stratum, and stores the header-compressed data to a to-be-sent buffer of a corresponding queue; or the MAC layer of the UE receives a PDCP PDU from a PDCP entity of the UE, and stores the PDCP PDU to a to-be-sent buffer of a corresponding queue, where the PDCP entity is corresponding to the queue.

Step 25b1: The MAC layer of the UE determines, according to a scheduling operation, a scheduled queue in the corresponding queues and a data amount corresponding to the queue, and performs concatenation or segmentation processing on data in the queue according to the data amount.

Step 25c1: The MAC layer of the UE perform multiplexing processing on the data after concatenation or segmentation processing to obtain a MAC PDU, and perform ciphering processing to obtain the ciphered MAC PDU.

Specifically, the MAC layer of the UE multiplexes the data after concatenation or segmentation processing, and encapsulates the data into a MAC PDU, where the MAC PDU includes a MAC header and a MAC SN, and the MAC SN is bound with the uplink HARQ process.

Optionally, a MAC CE is configured in a protocol by default, or the base station configures a corresponding maximum number of HARQ transmissions, where the MAC CE is multiplexed and transmitted with data in a queue whose maximum number of HARQ transmissions is the same as or greater than the maximum number of HARQ transmissions. When the MAC CE is multiplexed on a transmission resource whose maximum number of HARQ transmissions is smaller than the maximum number of HARQ transmissions of the MAC CE, if the MAC CE is not transmitted successfully when the corresponding number of transmissions is reached, the UE regenerates the MAC CE, and retransmits the MAC CE; or the maximum number of HARQ transmissions of the MAC CE is not limited, and if the MAC CE is still not transmitted successfully when a maximum number of HARQ transmissions corresponding to a transmission resource in which the MAC CE is located is reached, the UE regenerates the MAC CE, and retransmits the MAC CE.

Optionally, after step 25, this embodiment may further include the following steps:

Step 25a2: A sending RLC entity (for example, a sending O_UM-RLC entity) at an RLC layer of the UE receives a data packet sent by a PDCP layer.

Step 25b2: the sending RLC entity assemble the data packet into a MAC data packet of a size indicated by the MAC layer.

Step 25c2: Encapsulate an RLC header into the MAC data packet, and therefore form an RLC PDU, and send the RLC PDU to the MAC layer of the UE.

Step 25d2: The MAC layer of the UE performs multiplexing processing on the RLC PDU to obtain a MAC PDU, and performs ciphering processing to obtain the ciphered MAC PDU. Specifically, the MAC layer of the UE multiplexes the RLC PDU, and encapsulates the RLC PDU into a MAC PDU, where the MAC PDU includes a MAC header and a MAC SN, and the MAC SN is bound with the uplink HARQ process.

In addition, in this embodiment, when the UE is handed over from the base station (namely, a source base station) to a target base station, the method includes:

Step b1: After the UE is handed over from the base station and accesses the target base station, the UE report status information of a downlink HARQ process to the target base station.

Step b2: Receive status information of the uplink HARQ process sent by the target base station.

Step b3: The UE performs uplink HARQ process synchronization with the target base station according to the status information of the uplink HARQ process.

The status information of the uplink HARQ process includes the uplink HARQ process number, a MAC SN, and an ACK/NACK; and the status information of the downlink HARQ process includes a downlink HARQ process number, a MAC SN, and an ACK/NACK.

Figure 4:
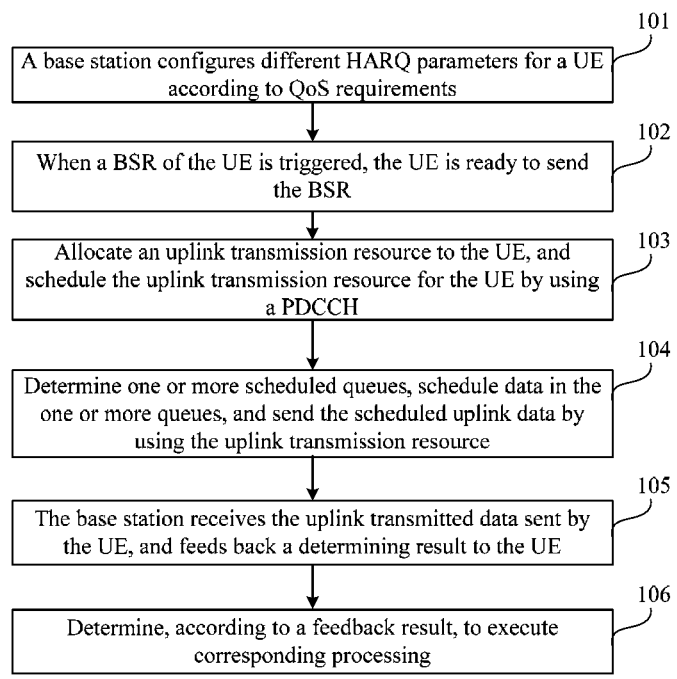
FIG. 4 is a flowchart of Embodiment 3 of a scheduling method according to the present invention.

FIG. 4 is a flowchart of Embodiment 3 of a scheduling method according to the present invention. As shown in FIG. 4, this embodiment provides a queue-based scheduling mechanism, including:

Step 101: A base station configures different HARQ parameters for a user equipment (User Equipment, UE) according to QoS requirements.

Specifically, the configuration of different HARQ parameters may be based on queues of the UE, or may be based on uplink HARQ processes, or may be based on queue groups.

If the configuration is based on the queues of the UE, the base station configures a maximum number of HARQ transmissions for each to-be-established or established queue of the UE. The to-be-established or established queue of the UE may be one or more queues. Optionally, the configuration may further include one or more uplink HARQ process numbers that may be used by the queue.

If the configuration is based on uplink HARQ processes, the base station configures a maximum number of HARQ retransmissions, and a number of one or more queues or a number of one or more queue groups of the UE for the UE, where the one or more queues or queue groups use the process. The uplink HARQ process of the UE may be one or more processes.

If the configuration is based on queue groups, the base station configures a maximum number of HARQ transmissions for each queue group of the UE. A queue group is a combination of queues for which a same maximum number of HARQ transmissions is configured, or a combination of queues that use a same uplink HARQ process. The queue groups are configured by the base station to specifically indicate the queues included in different queue groups. The queue group of the UE may be one or more queue groups. Optionally, the configuration may further include one or more uplink HARQ process numbers that may be used by the queue group.

The uplink HARQ process number is a number or an identity of an uplink HARQ process. The queue number is a number or an identity of a queue. The queue group number is a number or an identity of a queue group.

The queue of the UE may be a radio bearer (Radio Bearer, RB) of the UE, and therefore the queue number of the UE is an RB identity (Identity, ID) of the UE. The queue may also be different service streams of the UE that are classified in other manners, for example, different IP data streams that are classified by using different Internet Protocol (Internet Protocol, IP) addresses or different IP quintuples.

The queue group may be a logical channel group (Logical Channel Group, LCG) of the UE. The logical channel group includes one or more logical channels (Logical Channels, LCHs), where the logical channels are corresponding to the queues of the UE on a one-to-one basis.

Step 102: When a BSR of the UE is triggered, the UE is ready to send the buffer status report (Buffer Status Report, BSR).

Specifically, if an uplink transmission resource is available in a current transmission time interval (Transmission Time Interval, TTI), the UE directly uses the uplink transmission resource to send the BSR; otherwise, the UE triggers a scheduling request (Scheduling Request, SR), requesting the base station to allocate a resource to the UE for sending the BSR.

Because the BSR is a report on a current buffer status of the UE, the report may be based on a unit of a queue of the UE, or may be based on a unit of a queue group. Further, one BSR may include both a report in a unit of a queue and a report in a unit of a queue group.

The queues included in the queue group must be queues that are corresponding to a same maximum number of HARQ transmissions or may use a same uplink HARQ process.

Optionally, the BSR may be a report in a unit of a logical channel (Logical Channel, LCH), or may be a report in a unit of a logical channel group (Logical Channel Group, LCG), or may be a report in a unit of an LCH and a unit of an LCG.

Optionally, the base station may trigger the UE to send the BSR by using explicit signaling. Specifically, the base station sends a MAC control element (Control Element, CE) to the UE to may trigger the UE to send the BSR, and meanwhile, allocates a resource to the UE for transmitting the BSR, to ensure that the UE sends the BSR. The MAC CE may be a newly designed MAC CE, or may be implemented by adding a new parameter field to an existing MAC CE.

Step 103: After receiving the BSR sent by the UE, the base station allocates an uplink transmission resource to the UE, and schedules the uplink transmission resource for the UE by using a physical downlink control channel (Physical Downlink Control Channel, PDCCH).

Specifically, in the PDCCH indication, one or more queue numbers may be carried to indicate, to the UE, to which queue or which queues the uplink transmission resource may be allocated by the base station, or an uplink HARQ process number may be carried to indicate, to the UE, to which queue or which queues the uplink transmission resource may be allocated, or one or more queue group numbers may be carried to indicate, to the UE, to which queue or which queues the uplink transmission resource may be allocated.

Optionally, the uplink HARQ process number may be indicated to the UE in an implicit manner. For example, the base station configures a mapping relationship between the TTI and the uplink HARQ process number for the UE. After receiving the PDCCH indication, the UE may determine, according to the current TTI, the uplink HARQ process number implicitly indicated in the PDCCH indication. Specifically, the base station may also configure 10*SFN+subframe mod total HARQ number as the process number used in the current TTI, where the total HARQ number may be fixed in a protocol, or may be configured by the base station.

Optionally, when scheduling data of different queues, the base station may adjust a target block error rate (Block Error Rate, BLER) according to QoS requirements.

Step 104: The UE receives the PDCCH indication sent by the base station, determines one or more queues scheduled in the PDCCH indication, schedules data in the one or more queues, and sends the scheduled uplink data by using the uplink transmission resource.

Specifically, the method for determining one or more scheduled queues includes that:

if the PDCCH indication carries one or more queue numbers, the UE determines, according to the one or more queue numbers, one or more queues that may be scheduled;

if the PDCCH indication explicitly or implicitly carries an uplink HARQ process number, and the base station configures, for the UE, an uplink HARQ process that may be used by different queues or queue groups, the UE determines, by using the uplink HARQ process number carried in the PDCCH indication, one or more queues that may be scheduled; if the base station directly configures, for the UE, one or more queues or queue groups that may use the process, the UE may directly determine one or more queues that may be scheduled; and if the PDCCH indication carries one or more queue group numbers, the UE determines, according to the one or more queue group numbers, one or more queues that may be scheduled.

Specifically, the method for scheduling data in one or more queues includes that:

after determining one or more queues that may be scheduled, the UE schedules data in different queues according to a scheduling algorithm, and determines a scheduled data amount in each queue, where the scheduling algorithm may be an existing logical channel prioritization (Logical Channel Prioritization, LCP) procedure applied to one or more scheduled queues, or may be a proportional fair scheduling algorithm.

The MAC CE may be configured in the protocol by default, or the base station configures, a maximum number of HARQ transmissions corresponding to the MAC CE. The MAC CE may be multiplexed and transmitted with data in a queue whose maximum number of HARQ transmissions is the same as the maximum number of HARQ transmissions of the MAC CE. Optionally, to avoid excessive padding (padding), when the allocated transmission resource is large, if the MAC CE to be sent cannot occupy the whole transmission resource, the MAC CE may also be multiplexed with data in a queue whose maximum number of HARQ transmissions is greater than the maximum number of HARQ transmissions of the MAC CE.

Because generally a priority of a MAC CE is higher than a priority of data, if the maximum number of HARQ transmissions of a queue currently scheduled by the base station is smaller than the maximum number of HARQ transmissions of the MAC CE, according to the foregoing rule, the MAC CE cannot be multiplexed on the transmission resource.

On this basis, a MAC CE retransmission mechanism may be introduced. That is, the MAC CE is always multiplexed and transmitted on the transmission resource based on the priority of the MAC CE. When the MAC CE is multiplexed on a transmission resource whose maximum number of HARQ transmissions is smaller than the maximum number of HARQ transmissions of the MAC CE, if the MAC CE is not transmitted successfully when the corresponding number of transmissions is reached, the UE regenerates the MAC CE, and retransmits the MAC CE. Further, the maximum number of HARQ transmissions of the MAC CE may not be limited, and if the MAC CE is still not transmitted successfully when a maximum number of HARQ transmissions corresponding to a transmission resource in which the MAC CE is located is reached, the UE regenerates the MAC CE, and retransmits the MAC CE. The method for regenerating the MAC CE includes: retriggering the MAC CE, and when an uplink transmission resource is available later, regenerating MAC CE; or before the MAC CE is sent successfully, keeping in a triggering state, and therefore after finding that the MAC CE fails to be transmitted, when an uplink transmission resource is available, regenerating the MAC CE.

Step 105: The base station receives the uplink transmitted data sent by the UE, determines correctness of the data, and feeds back a determining result to the UE.

Specifically, when performing a HARQ feedback, the base station may specify, for the UE, an uplink HARQ process number corresponding to the feedback, or may implicitly indicate, by using an uplink HARQ synchronization feature and a time sequence relationship, a process number corresponding to the HARQ feedback. If the HARQ feedback is a NACK, and the base station wishes the UE to perform an adaptive retransmission, the base station, by means of PDCCH scheduling, instructs the UE to perform the adaptive retransmission, where the retransmitted PDCCH may explicitly carry the uplink HARQ process number to be retransmitted, or the uplink HARQ process number may be implicitly indicated by using the uplink HARQ synchronization feature and time sequence relationship.

Step 106: After receiving the HARQ feedback sent by the base station, the UE determines, according to a feedback result, to execute corresponding processing.

Specifically, the UE receives the HARQ feedback, and determines the corresponding uplink HARQ process number of the feedback. If there is no explicit uplink HARQ process number in the HARQ feedback received by the UE, the UE determines, according to the uplink HARQ synchronization feature and by using the time sequence relationship, the uplink HARQ process number corresponding to the HARQ feedback.

If the feedback is a NACK, and there is no PDCCH retransmission indication, the UE executes a non-adaptive retransmission. If the UE receives a PDCCH retransmission indication, the UE determines an uplink HARQ process number corresponding to the PDCCH retransmission indication. If there is no explicit uplink HARQ process number in the PDCCH retransmission indication received by the UE, the UE determines, according to the uplink HARQ synchronization feature and by using the time sequence relationship, the uplink HARQ process number corresponding to the PDCCH retransmission indication, and performs an adaptive retransmission according to the retransmission indication.

Optionally, if the UE determines that the number of transmissions of the process has reached the maximum number of HARQ transmissions, for some queues, uplink HARQ processes, or queue groups for which lossless transmissions are configured, the UE indicates that a maximum number of Radio Resource Control (Radio Resource Control, RRC) HARQ retransmissions is reached, and executes an RRC connection reestablishment procedure.

A QoS-based HARQ transmission method is implemented in Embodiment 3 of the scheduling method, that is, different numbers of HARQ transmissions are configured for different queues having different QoS requirements, and reliability of data having a high reliability requirement is further improved. Therefore, an ARQ function of an RLC layer may be canceled. For a current reordering (reordering) function of the RLC layer, because a problem of data packet disorder is caused by a HARQ retransmission, to ensure correlations in division of protocol layers, the function may be transferred to a MAC layer for implementation. In this way, the RLC layer has only a concatenation/segmentation function. To reduce complexity of protocol processing and simplify the protocol design, the function may also be transferred to the MAC layer.

For a PDCP layer, to perform ciphering and integrity protection, a PDCP sequence number (Sequence Number, SN) needs to be added. For a small packet with multi-layer SNs, the overhead is large, and the transmission efficiency is low. To execute the reordering function, the MAC layer needs to add an SN to a MAC PDU. If this SN can be used to implement both the ciphering and integrity protection functions, a PDCP SN is saved. In addition, because data of multiple queues may be multiplexed in a MAC PDU, the method of adding an SN to a MAC PDU, from a perspective of SN overhead saving, is necessarily superior to the method of implementing reordering by using an RLC SN in the prior art. Therefore, the ciphering and integrity protection functions of the PDCP layer may be transferred to the MAC layer. In this way, the PDCP layer has only a header compression function. Likewise, to reduce complexity of protocol processing and simplify the protocol design, the function may also be transferred to the MAC layer.

Figure 5:
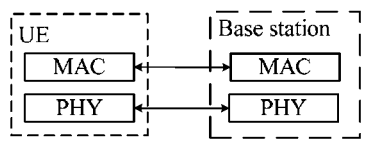
FIG. 5 is a schematic diagram of a simplified LTE RAN UP protocol stack in Embodiment 4 of a scheduling method according to the present invention.
Figure 6:
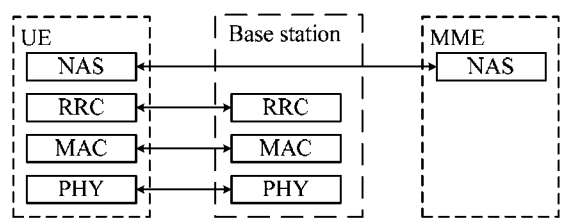
FIG. 6 is a schematic diagram of a simplified LTE RAN CP protocol stack in Embodiment 4 of a scheduling method according to the present invention.
Figure 7:
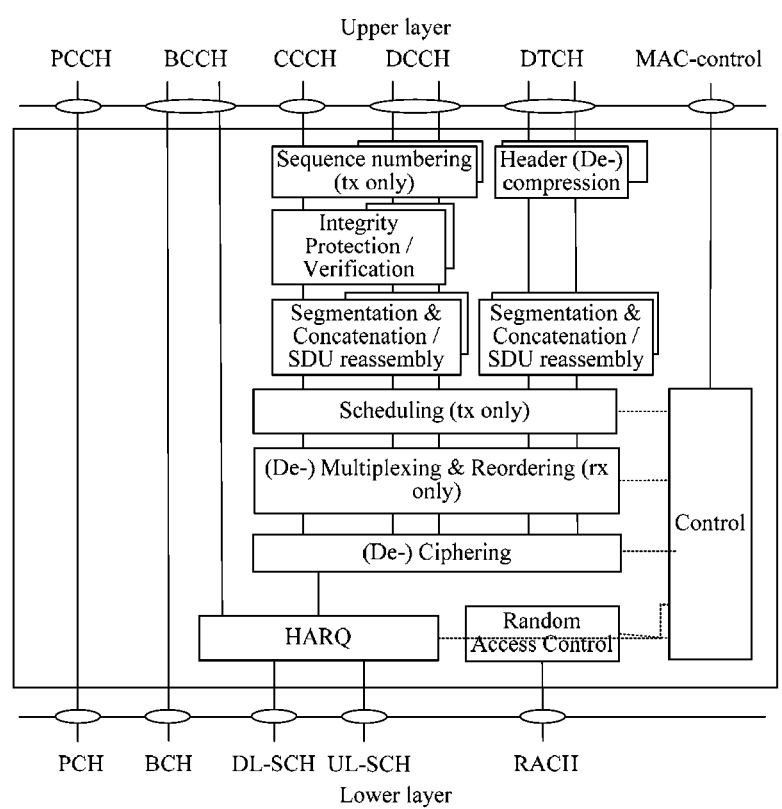
FIG. 7 is a schematic structural diagram of a simplified MAC layer in Embodiment 4 of a scheduling method according to the present invention.

FIG. 5 and FIG. 6 are respectively schematic diagrams of simplified LTE RAN UP and control plane (Control Plane, CP) protocol stacks in Embodiment 4 of a scheduling method according to the present invention. FIG. 7 is a schematic structural diagram of a simplified MAC layer in Embodiment 4 of a scheduling method according to the present invention.

Figure 8:
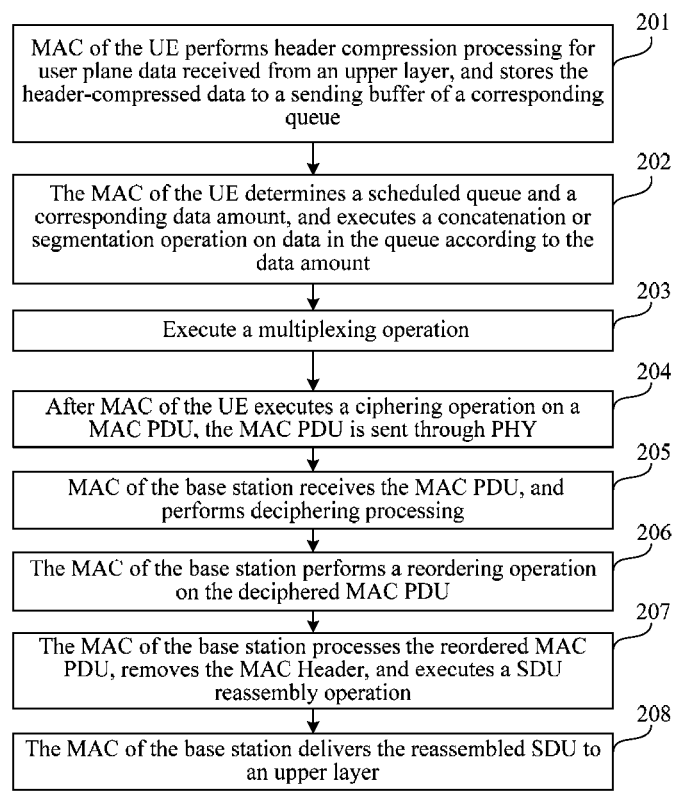
FIG. 8 is a first flowchart of Embodiment 4 of a scheduling method according to the present invention.

FIG. 8 is a first flowchart of Embodiment 4 of a scheduling method according to the present invention. According to the structural diagram of the MAC layer shown in FIG. 7, using sending of uplink data as an example, a user plane data dedicated traffic channel (Dedicated Traffic Channel, DTCH) processing procedure, that is, a procedure for sending uplink transmitted data to a base station by a UE, is as follows:

Step 201: A MAC layer of the UE performs header compression (Header Compression) processing (if configured) for user plane data received from an upper layer, and stores the header-compressed data to a to-be-sent buffer of a corresponding queue.

Specifically, the queue of the UE is corresponding to a logical channel LCH (DTCH) on a one-to-one basis.

Step 202: The MAC layer of the UE determines a scheduled queue and a corresponding data amount according to a scheduling (Scheduling) operation, and executes a concatenation and/or segmentation operation on data in the queue according to the data amount.

Step 203: If more than one queue is scheduled, the MAC layer of the UE needs to execute a multiplexing (Multiplexing) operation.

Optionally, if the base station configures a one-to-one mapping relationship between queues and uplink HARQ processes, and specifies an uplink HARQ process number explicitly or implicitly in a PDCCH scheduling indication, data of multiple queues is not multiplexed in one transmission.

The UE multiplexes the data after concatenation or segmentation processing in the scheduled queue, encapsulates the data into a MAC PDU, adds a MAC SN and a corresponding MAC header, where the MAC SN is a part of the MAC header, and binds the MAC SN with the uplink HARQ process.

Step 204: After executing a ciphering operation on a MAC PDU, the MAC of the UE sends the MAC PDU through a physical layer (PHY).

Step 205: A MAC layer of the base station receives the MAC PDU, and performs deciphering processing.

Step 206: The MAC of the base station performs a reordering (Reordering) operation on the deciphered MAC PDU.

Specifically, the reordering operation is implemented mainly depending on a MAC SN, a reordering timer, and a reordering window.

Step 207: The MAC of the base station processes the reordered MAC PDU, removes the MAC Header, and executes a service data unit (Service Data Unit, SDU) reassembly (SDU reassembly) operation.

Step 208: The MAC of the base station delivers the reassembled SDU to an upper non-access stratum.

Figure 9:
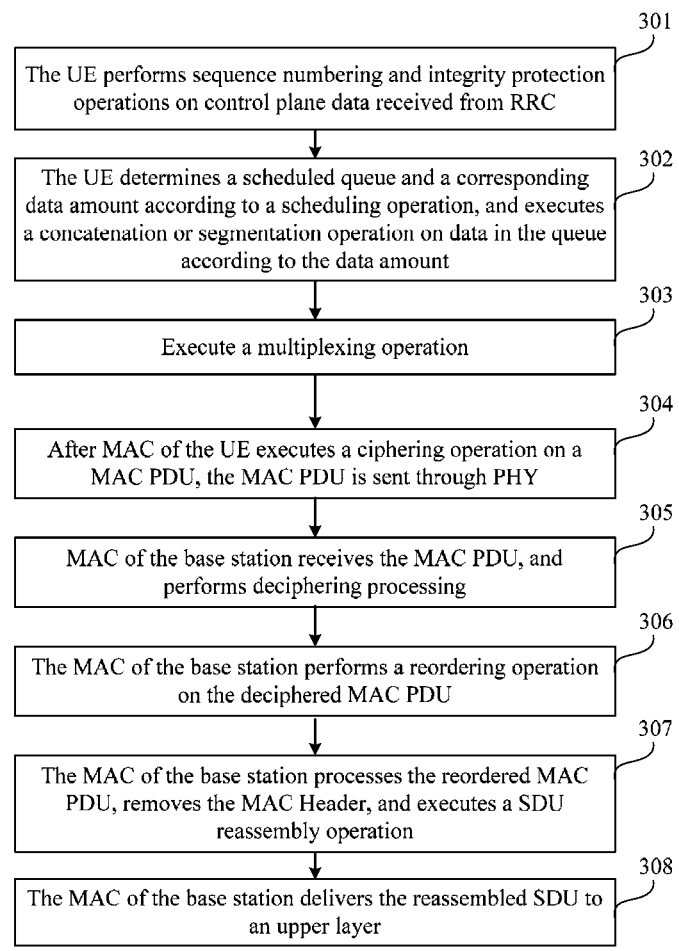
FIG. 9 is a second flowchart of Embodiment 4 of a scheduling method according to the present invention.

FIG. 9 is a second flowchart of Embodiment 4 of a scheduling method according to the present invention. According to the structural diagram of the MAC layer shown in FIG. 7, using sending of uplink data as an example, a control plane data dedicated control channel (Dedicated Control Channel, DCCH) processing procedure, that is, another procedure for sending uplink transmitted data to a base station by a UE, is specifically as follows:

Step 301: The UE performs sequence numbering (Sequence Numbering) and integrity protection (Integrity Protection) operations on control plane data received from RRC, and stores the processed data to a to-be-sent buffer of a corresponding queue.

Specifically, the queue of the UE is corresponding to a logical channel LCH (DCCH) on a one-to-one basis.

Step 302: The UE determines a scheduled queue and a corresponding data amount according to a scheduling operation, and executes a concatenation or segmentation operation on data in the queue according to the data amount.

Step 303: If more than one queue is scheduled, it is necessary to execute a multiplexing operation by the MAC layer of the UE.

Optionally, if the base station configures a one-to-one mapping relationship between queues and uplink HARQ processes, and specifies an uplink HARQ process number explicitly or implicitly in a PDCCH scheduling indication, data of multiple queues is not multiplexed in one transmission by the MAC layer of the UE.

The UE multiplexes the data after concatenation or segmentation processing in the scheduled queue, encapsulates the data into a MAC PDU, adds a MAC SN and a corresponding MAC header, where the MAC SN is a part of the MAC header, and binds the MAC SN with the uplink HARQ process.

Step 304: After executing a ciphering operation on a MAC PDU, MAC of the UE sends the MAC PDU through a physical layer.

Step 305: MAC of the base station receives the data sent by the UE, and performs deciphering.

Step 306: The MAC of the base station performs a reordering operation on the deciphered MAC PDU.

Specifically, the reordering operation is implemented mainly depending on a MAC SN, a reordering timer, and a reordering window.

Step 307: The MAC of the base station processes the reordered MAC PDU, removes the MAC Header, and executes a SDU reassembly operation.

Step 308: The MAC of the base station delivers the reassembled SDU to an upper layer.

In addition, according to a scheduling operation, user plane data and control plane data may also be multiplexed.

A QoS-based HARQ transmission method is implemented in Embodiment 4 of the scheduling method according to the present invention, that is, different numbers of HARQ transmissions are configured for different queues having different QoS requirements, and reliability of an RB having a high reliability requirement is further improved. Therefore, an ARQ function of an RLC layer may be canceled, and the RLC protocol is simplified. In addition, due to a problem of disorder caused by a HARQ retransmission, a reordering function needs to be introduced to reorder received data and ensure in-sequence delivery of the data. In the existing LTE protocol, this function is implemented at the RLC layer. However, because this function is introduced due to the HARQ mechanism, to ensure correlations in division of protocol layers, the reordering function of the RLC layer is transferred to a MAC layer for implementation. Because the ARQ and reordering functions are both removed from the RLC layer, it is also necessary to add an RLC SN to an RLC protocol data unit (Protocol Data Unit, PDU). In this way, the RLC layer has only a concatenation/segmentation function. To reduce complexity of protocol processing and simplify the protocol design, the function may also be transferred to the MAC layer.

Figure 10:
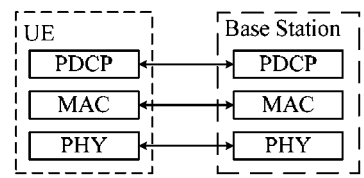
FIG. 10 is a schematic diagram of a simplified LTE RAN UP protocol stack in Embodiment 5 of a scheduling method according to the present invention.
Figure 11:
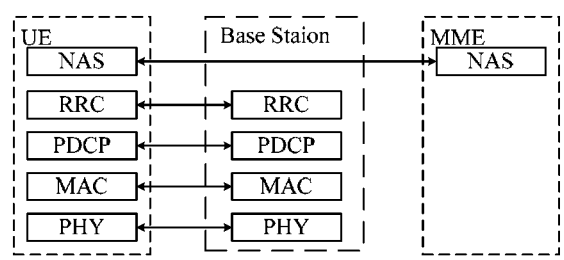
FIG. 11 is a schematic diagram of a simplified LTE RAN CP protocol stack in Embodiment 5 of a scheduling method according to the present invention.
Figure 12:
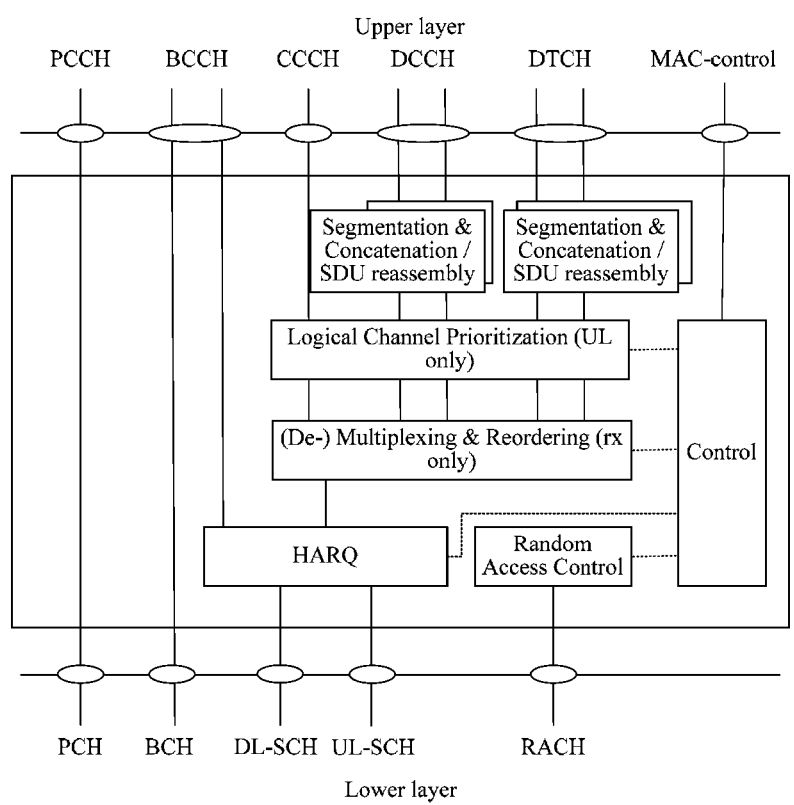
FIG. 12 is a schematic structural diagram of a simplified MAC layer in Embodiment 5 of a scheduling method according to the present invention.

FIG. 10 and FIG. 11 are respectively schematic diagrams of simplified LTE RAN UP and CP protocol stacks in Embodiment 5 of a scheduling method according to the present invention. FIG. 12 is a schematic structural diagram of a simplified MAC layer in Embodiment 5 of a scheduling method according to the present invention.

Figure 13:
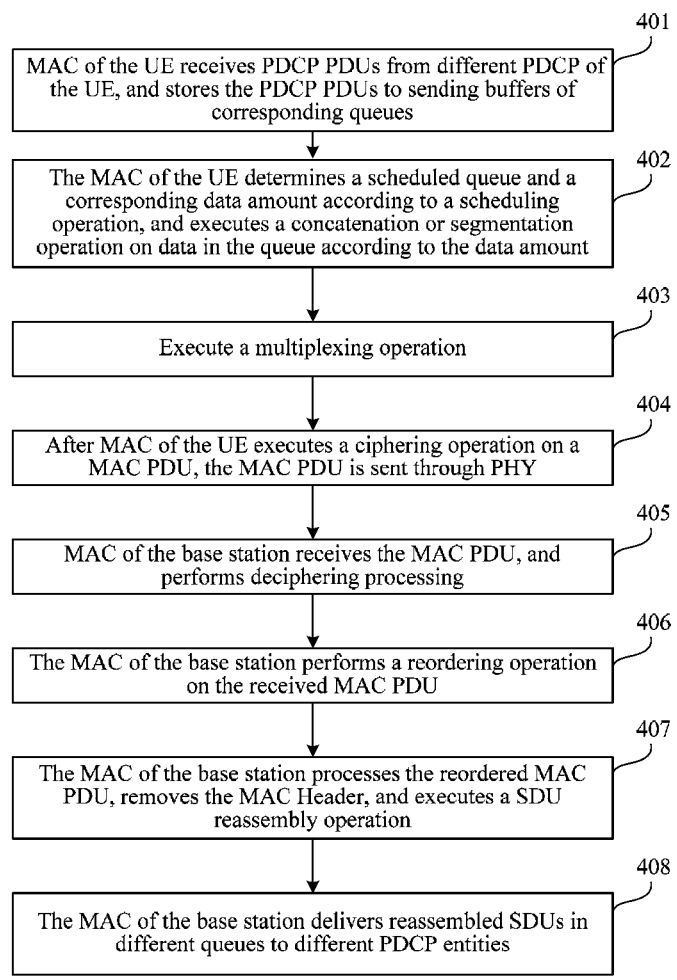
FIG. 13 is a flowchart of Embodiment 5 of a scheduling method according to the present invention.

FIG. 13 is a flowchart of Embodiment 5 of a scheduling method according to the present invention. According to the structural diagram of the MAC layer shown in FIG. 12, using sending of uplink data as an example, a data processing procedure, that is, a procedure for sending uplink transmitted data to a base station by a UE is specifically as follows:

Step 401: A MAC layer of the UE receives PDCP PDUs from different PDCP entities of the UE, and stores the PDCP PDUs to to-be-sent buffers of corresponding queues.

Specifically, the PDCP entities are corresponding to the queues on a one-to-one basis, and corresponding to logical channels LCHs (DTCHs or DCCHs) on a one-to-one basis.

Step 402: The MAC layer of the UE determines a scheduled queue and a corresponding data amount according to a scheduling operation, and executes a concatenation or segmentation operation on data in the queue according to the data amount.

Step 403: If more than one queue is scheduled, it is necessary to execute a multiplexing operation.

Optionally, if the base station configures a one-to-one mapping relationship between queues and uplink HARQ processes, and specifies an uplink HARQ process number explicitly or implicitly in a PDCCH scheduling indication, data of multiple queues is not multiplexed in one transmission.

The UE multiplexes the data after concatenation or segmentation processing in the scheduled queue, encapsulates the data into a MAC PDU, adds a MAC SN and a corresponding MAC header, where the MAC SN is a part of the MAC header, and binds the MAC SN with the uplink HARQ process.

Step 404: After executing a ciphering operation on a MAC PDU, the MAC layer of the UE sends the MAC PDU through a physical layer.

Step 405: MAC of the base station receives the MAC PDU sent by the UE, and performs deciphering processing.

Step 406: The MAC of the base station performs a reordering operation on the deciphered MAC PDU.

Specifically, the reordering operation is implemented mainly depending on a MAC SN, a reordering timer, and a reordering window.

Step 407: The MAC of the base station processes the reordered MAC PDU, removes the MAC Header, and executes a SDU reassembly operation.

Step 408: The MAC of the base station delivers reassembled SDUs in different queues to different PDCP entities.

A QoS-based HARQ transmission method is implemented in Embodiment 5 of the scheduling method according to the present invention, that is, different numbers of HARQ transmissions are configured for different queues having different QoS requirements, and reliability of an RB having a high reliability requirement is further improved. Therefore, an ARQ function of an RLC layer may be canceled, and the RLC protocol is simplified. In addition, due to a problem of disorder caused by a HARQ retransmission, a reordering function needs to be introduced to reorder received data and ensure in-sequence delivery of the data. In the existing LTE protocol, this function is implemented at the RLC layer. However, because this function is introduced due to the HARQ mechanism, to ensure correlations in division of protocol layers, the reordering function of the RLC layer is transferred to a MAC layer for implementation. Because the ARQ and reordering functions are both removed from the RLC layer, it is also unnecessary to add an RLC SN to an RLC PDU.

Therefore, the RLC layer includes data transmission mechanisms of two modes:

A transparent mode (Transparent Mode, TM) is a TM transmission mode that still reserves the RLC layer. An optimized unacknowledged mode (Optimized Unacknowledged Mode, O_UM) is an optimized UM transmission mode.

Figure 14:
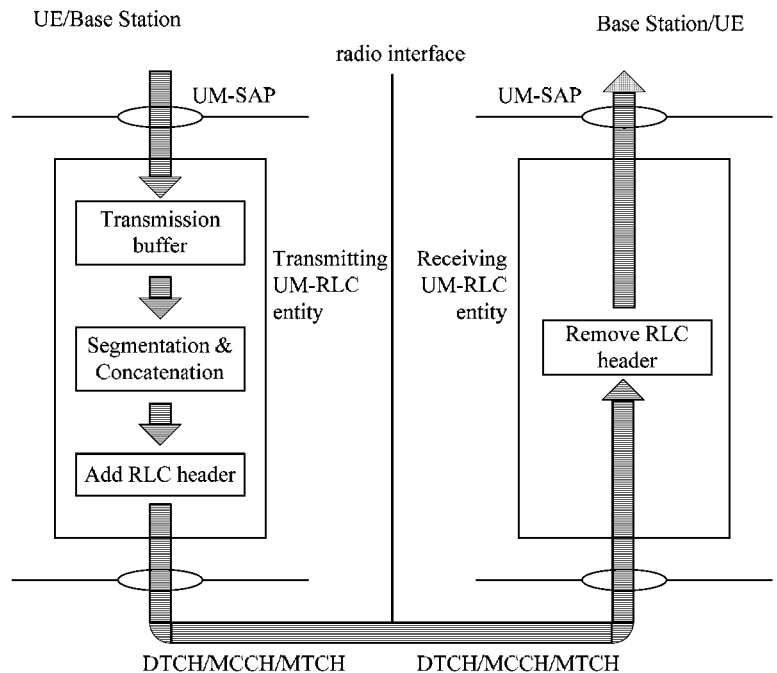
FIG. 14 is a structural diagram of an RLC layer in Embodiment 6 of a scheduling method according to the present invention.

FIG. 14 is a structural diagram of an RLC layer in Embodiment 6 of a scheduling method according to the present invention. It should be noted that, one O_UM entity is responsible for processing data in one queue, that is, the O_UM entity is corresponding to the queue on a one-to-one basis.

Figure 15:
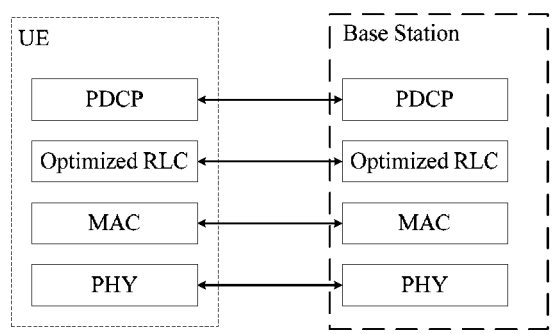
FIG. 15 is a schematic diagram of a simplified LTE RAN UP protocol stack in Embodiment 6 of a scheduling method according to the present invention.
Figure 16:
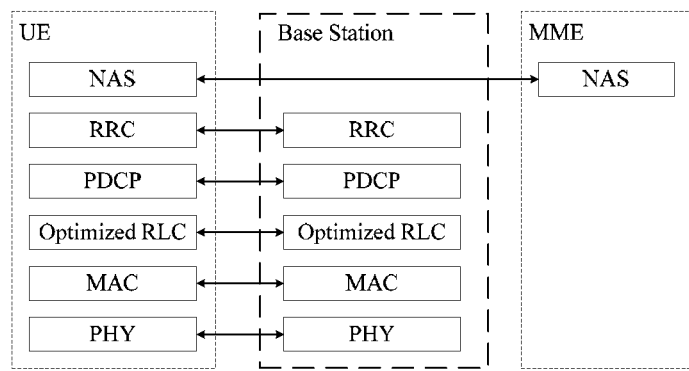
FIG. 16 is a schematic diagram of a simplified LTE RAN CP protocol stack in Embodiment 6 of a scheduling method according to the present invention.
Figure 17:
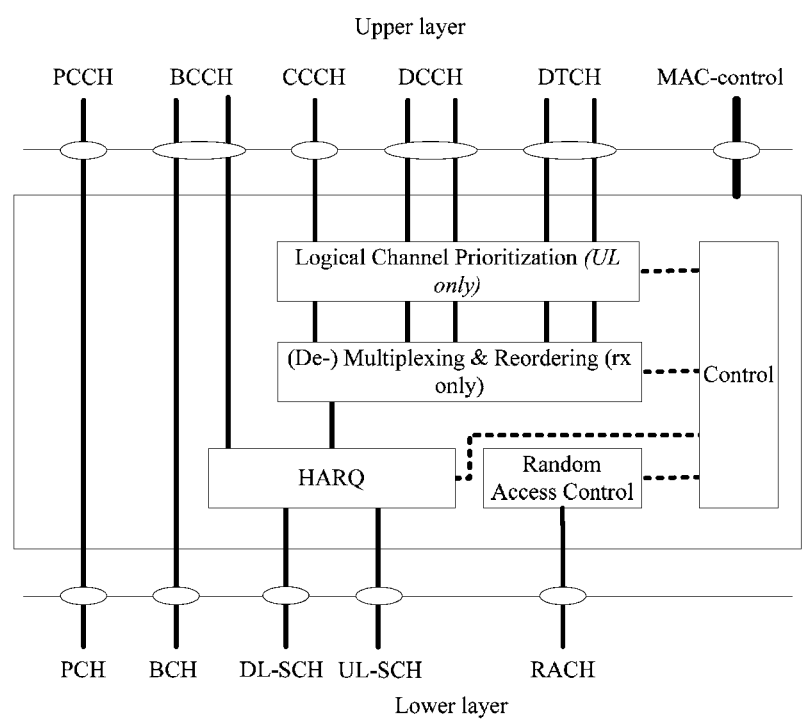
FIG. 17 is a schematic structural diagram of a simplified MAC layer in Embodiment 6 of a scheduling method according to the present invention.

FIG. 15 and FIG. 16 are respectively schematic diagrams of simplified LTE RAN UP and CP protocol stacks in Embodiment 6 of a scheduling method according to the present invention. FIG. 17 is a schematic structural diagram of a simplified MAC layer in Embodiment 6 of a scheduling method according to the present invention.

Figure 18:
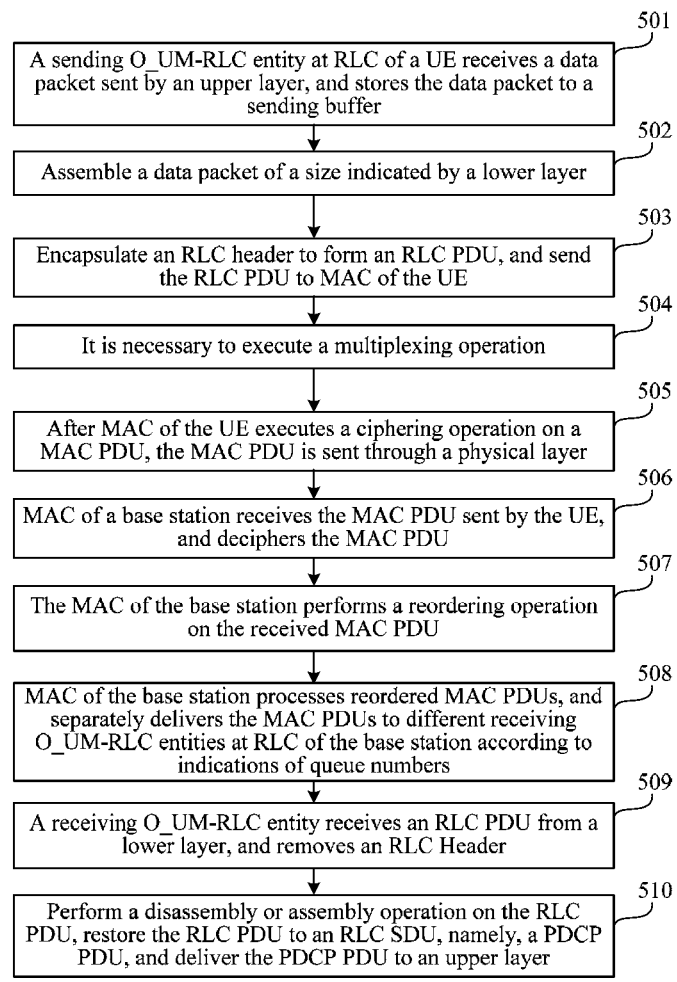
FIG. 18 is a flowchart of Embodiment 6 of a scheduling method according to the present invention.

FIG. 18 is a flowchart of Embodiment 6 of a scheduling method according to the present invention. According to the structural diagram of an RLC layer shown in FIG. 14 and the structural diagram of the MAC layer shown in FIG. 17, using sending of uplink data as an example, a data processing procedure is as follows:

Step 501: A sending RLC entity at an RLC layer of a UE receives a data packet sent by an upper layer (PDCP layer), and stores the data packet to a to-be-sent buffer.

Specifically, the RLC entity is corresponding to a queue on a one-to-one basis.

Step 502: The RLC entity assemble a data packet of a size (the size includes an RLC header) indicated by a lower layer (MAC layer).

Specifically, after a scheduling operation at the MAC layer, a scheduled queue and a corresponding data amount are determined, and according to the data amount, the sending RLC entity may perform concatenation on multiple RLC service data units (Service Data Units, SDUs), or may perform segmentation on one RLC SDU.

Step 503: Encapsulate an RLC header to form an RLC PDU, and send the RLC PDU to the MAC layer of the UE.

The RLC header specifically includes a concatenation and/or segmentation indication, but does not include an RLC SN.

Step 504: If more than one queue is scheduled, the MAC layer of the UE needs to execute a multiplexing operation.

Optionally, if a base station configures a one-to-one mapping relationship between queues and uplink HARQ processes, and specifies an uplink HARQ process number explicitly or implicitly in a PDCCH scheduling indication, data of multiple queues is not multiplexed in one transmission.

The UE multiplexes the data after concatenation or segmentation processing in the scheduled queue, encapsulates the data into a MAC PDU, adds a MAC SN and a corresponding MAC header, where the MAC SN is a part of the MAC header, and binds the MAC SN with the uplink HARQ process.

Step 505: After executing a ciphering operation on a MAC PDU, the MAC layer of the UE sends the MAC PDU through a physical layer.

Step 506: A MAC layer of a base station receives the MAC PDU sent by the UE, and deciphers the MAC PDU.

Step 507: The MAC layer of the base station performs a reordering operation on the deciphered MAC PDU.

Specifically, the reordering operation is implemented mainly depending on a MAC SN, a reordering timer, and a reordering window.

Step 508: The MAC layer of the base station processes reordered MAC PDUs, removes MAC Headers, restores the MAC PDUs to different MAC SDUs, and separately delivers the MAC PDUs to corresponding receiving RLC entities at an RLC layer of the base station according to indications of queue numbers of the RLC PDUs, where the indications are carried in the MAC headers.

Step 509: A receiving RLC entity receives an RLC PDU from a lower layer (MAC layer), and removes an RLC Header.

Step 510: The RLC entity perform a disassembly or assembly operation on the RLC PDU, restore the RLC PDU to an RLC SDU, namely, a PDCP PDU, and deliver the PDCP PDU to an upper layer (PDCP layer).

A QoS-based HARQ transmission method is implemented in Embodiment 6 of the scheduling method according to the present invention, that is, different numbers of HARQ transmissions are configured for different queues having different QoS requirements, and reliability of an RB having a high reliability requirement is further improved. Therefore, an ARQ function of an RLC layer may be canceled, and the RLC protocol is simplified.

Therefore, the RLC layer includes data transmission mechanisms of only two modes:

A transparent mode (Transparent Mode, TM) is a TM transmission mode of the RLC layer. An optimized unacknowledged mode (Unacknowledged Mode, UM) is a UM transmission mode of the RLC layer.

Figure 19:
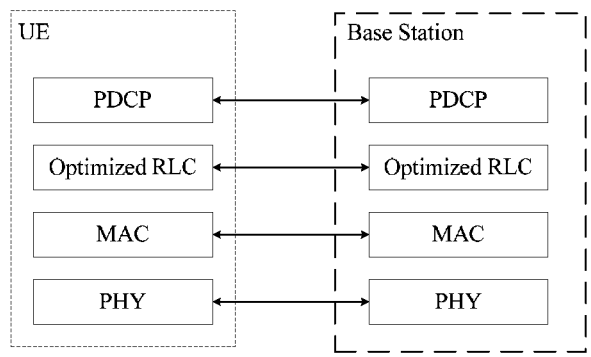
FIG. 19 is a schematic diagram of a simplified LTE RAN UP protocol stack in Embodiment 7 of a scheduling method according to the present invention.
Figure 20:
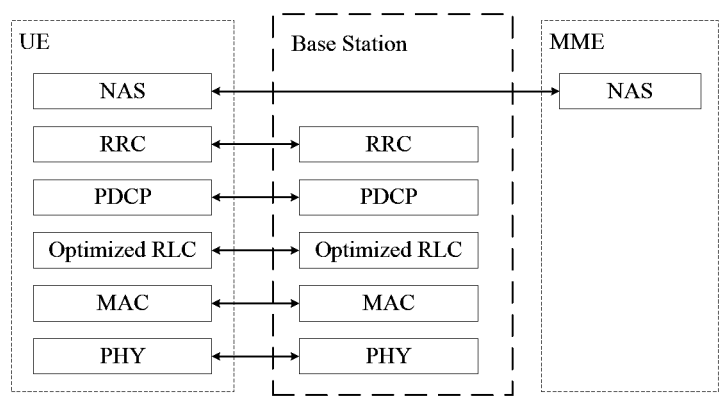
FIG. 20 is a schematic diagram of a simplified LTE RAN CP protocol stack in Embodiment 7 of a scheduling method according to the present invention.

FIG. 19 and FIG. 20 are respectively schematic diagrams of simplified LTE RAN UP and CP protocol stacks in Embodiment 7 of a scheduling method according to the present invention.

Figure 21:
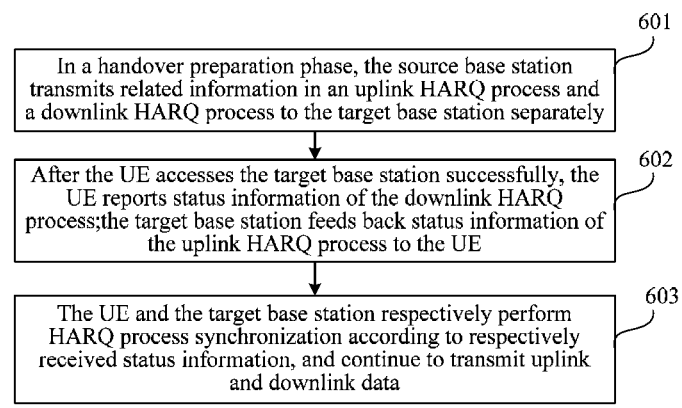
FIG. 21 is a flowchart of a UE handover in an embodiment of a scheduling method according to the present invention.

Because an ARQ operation is canceled in Embodiment 1 of the scheduling method according to the present invention, lossless transmission processing needs to be performed during a handover. FIG. 21 is a flowchart of a UE handover in an embodiment of a scheduling method according to the present invention. That is, before method Embodiment 1 of the scheduling according to the present invention, a procedure of handing over a UE from a source base station to a target base station is included, as shown in the following steps:

Step 601: In a handover preparation phase, the source base station transmits related information in an uplink HARQ process and related information in a downlink HARQ process to the target base station separately.

Specifically, the related information in the uplink HARQ process may include an uplink HARQ process number, an uplink MAC SN, and a size of a transport block (Transmission Block, TB) corresponding to a MAC PDU; and the related information in the downlink HARQ process may include a downlink HARQ process number and a downlink MAC SN.

Step 602: After the UE accesses the target base station successfully, the UE reports status information of the downlink HARQ process to the target base station by using a MAC CE. The target base station feeds back status information of the uplink HARQ process to the UE.

Specifically, the status information of the downlink HARQ process may include the downlink HARQ process number, the MAC SN, and an ACK/NACK; and the status information of the uplink HARQ process may include the uplink HARQ process number, the MAC SN, and an ACK/NACK.

Step 603: The UE and the target base station respectively perform uplink HARQ process synchronization and downlink HARQ process synchronization according to respectively received status information, and continue to transmit uplink and downlink data.

The scheduling methods according to the embodiments of the present invention may simplify a protocol stack, reduce complexity of the protocol stack, reduce an overhead, and improve the processing efficiency and transmission efficiency.

Embodiments of scheduling methods according to the present invention are described above. Embodiments of scheduling apparatuses according to the present invention are described below.

Figure 22:
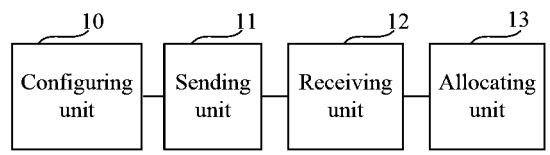
FIG. 22 is a schematic diagram of an embodiment of a base station according to the present invention.

FIG. 22 is a schematic diagram of an embodiment of a base station according to the present invention. As shown in the figure, the base station includes a configuring unit 10, a sending unit 11, a receiving unit 12, and an allocating unit 13.

The configuring unit 10 is configured to configure a Hybrid Automatic Repeat Request HARQ parameter for a UE according to a quality of service QoS requirement, and send the HARQ parameter to the sending unit 11; the sending unit 11 is configured to send the HARQ parameter to the UE; the receiving unit 12 is configured to receive a buffer status report BSR that is sent by the UE according to the HARQ parameter, and send the BSR to the allocating unit 13; the allocating unit 13 is configured to allocate a first uplink transmission resource to the UE according to the BSR, and schedule the first uplink transmission resource for the UE.

Specifically, the configuring unit 10 may be configured to configure the HARQ parameter for a queue of the UE according to a reliability requirement in the QoS requirement; the HARQ parameter includes a maximum number of HARQ transmissions, or includes an uplink HARQ process number used by the queue of the UE and a maximum number of HARQ transmissions; and the allocating unit 13 is specifically configured to notify, by using a PDCCH indication, the UE of the first uplink transmission resource allocated to the queue of the UE.

Alternatively, the configuring unit 10 may be configured to configure the HARQ parameter for a queue group of the UE according to a reliability requirement in the QoS requirement; the HARQ parameter includes a maximum number of HARQ transmissions, or includes a maximum number of HARQ transmissions and an uplink HARQ process number used by the queue group of the UE; and the allocating unit 13 is specifically configured to notify, by using a PDCCH indication, the UE of the first uplink transmission resource allocated to the queue group of the UE.

Alternatively, the configuring unit 10 may be configured to configure the HARQ parameter for an uplink HARQ process of the UE according to a reliability requirement in the QoS requirement; the HARQ parameter includes a maximum number of retransmissions of the uplink HARQ process, or includes a maximum number of retransmissions of the uplink HARQ process and a number of a queue or a queue group of the UE, where the queue or queue group uses the uplink HARQ process; and the allocating unit 13 is specifically configured to notify, by using a PDCCH indication, the UE of the first uplink transmission resource allocated to the uplink HARQ process.

Queues in the queue group are corresponding to the same maximum number of HARQ retransmissions, or queues in the queue group use the same uplink HARQ process. The receiving unit 12 is specifically configured to receive the BSR that is sent by the UE according to a unit of a queue, or a queue group, or a queue and a queue group of the UE defined in the HARQ parameter.

The sending unit 11 may be further configured to send, when the UE is handed over from the base station (namely, a source base station) to a target base station, information in the uplink HARQ process and information in a downlink HARQ process to the target base station; after the UE accesses the target base station, the target base station receives status information of the downlink HARQ process reported by the UE, sends status information of the uplink HARQ process to the UE, and performs downlink HARQ process synchronization with the UE according to the status information of the downlink HARQ process.

The receiving unit 12 may be further configured to receive uplink transmitted data that is sent by the UE by using the first uplink transmission resource.

Optionally, the uplink transmitted data includes a ciphered MAC PDU; the receiving unit 12 is specifically configured to receive, by using a MAC layer of the base station, the ciphered MAC PDU that is sent by the UE by using the first uplink transmission resource; and the MAC layer of the base station is configured to perform deciphering processing on the ciphered MAC PDU to obtain the MAC PDU; perform reordering processing on the MAC PDU; perform MAC header removal processing on the reordered MAC PDU, and then perform SDU reassembly to generate a MAC SDU; and send the MAC SDU to a non-access stratum of the base station.

Optionally, the uplink transmitted data includes a ciphered MAC PDU; the receiving unit 12 is specifically configured to receive, by using a MAC layer of the base station, the ciphered MAC PDU that is sent by the UE by using the first uplink transmission resource; the MAC layer of the base station is configured to perform deciphering processing on the ciphered MAC PDU to obtain the deciphered MAC PDU; perform reordering processing on the MAC PDU; perform MAC header removal processing on the reordered MAC PDU to obtain a MAC SDU, where the MAC SDU includes an RLC PDU; and send the RLC PDU to a receiving RLC entity at an RLC layer of the base station according to an indication of a queue number of the RLC PDU, where the indication is carried in the MAC header; and the receiving RLC entity is configured to perform RLC Header removal processing on the RLC PDU, and then perform disassembly or assembly processing to restore the RLC PDU to an RLC SDU, and send the RLC SDU to a PDCP layer of the base station.

Figure 23:
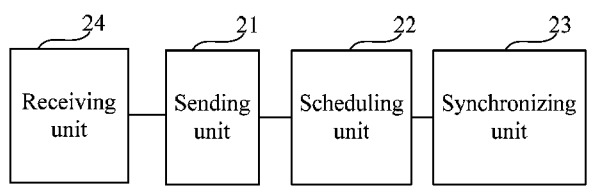
FIG. 23 is a schematic diagram of an embodiment of a user equipment according to the present invention.

FIG. 23 is a schematic diagram of an embodiment of a user equipment UE according to the present invention. As shown in the figure, this embodiment specifically includes a receiving unit 21, a sending unit 22, and a scheduling unit 23.

The receiving unit 21 is configured to receive a HARQ parameter that is configured by a base station according to a QoS requirement, and send the HARQ parameter to the sending unit 22; the sending unit 22 is configured to send a BSR to the base station according to the HARQ parameter; the receiving unit 21 is further configured to receive an indication of a first uplink transmission resource that is allocated to the UE and scheduled by the base station, and send the indication to the scheduling unit 23; and the scheduling unit 23 is configured to determine a scheduled queue according to the indication, schedule uplink transmitted data in the queue, and send the uplink transmitted data to the sending unit 22.

Specifically, the receiving unit 21 may be configured to receive the HARQ parameter that is configured by the base station for the queue of the UE according to a reliability requirement in the QoS requirement; the HARQ parameter includes a maximum number of HARQ transmissions, or includes an uplink HARQ process number used by the queue of the UE and a maximum number of HARQ transmissions; and the receiving unit 21 is specifically configured to receive a notification of the first uplink transmission resource allocated to the queue of the UE, where the notification is sent by the base station to the UE by using a PDCCH indication.

Alternatively, the receiving unit 21 may be configured to receive the HARQ parameter that is configured by the base station for a queue group of the UE according to a reliability requirement in the QoS requirement; the HARQ parameter includes a maximum number of HARQ transmissions, or includes a maximum number of HARQ transmissions and an uplink HARQ process number used by the queue group of the UE; and the receiving unit 21 is specifically configured to receive a notification of the first uplink transmission resource allocated to the queue group of the UE, where the notification is sent by the base station to the UE by using a PDCCH indication.

Alternatively, the receiving unit 21 may be configured to receive the HARQ parameter that is configured by the base station for an uplink HARQ process of the UE according to a reliability requirement in the QoS requirement; the HARQ parameter includes a maximum number of retransmissions of the uplink HARQ process, or includes a maximum number of retransmissions of the uplink HARQ process and a number of a queue or a queue group of the UE, where the queue or queue group uses the uplink HARQ process; and the receiving unit 21 is specifically configured to receive a notification of the first uplink transmission resource allocated to the uplink HARQ process, where the notification is sent by the base station to the UE by using a PDCCH indication.

Queues in the queue group are corresponding to the same maximum number of HARQ retransmissions, or queues in the queue group use the same uplink HARQ process. The sending unit 22 may be configured to send the BSR to the base station according to a unit of a queue, or a queue group, or a queue and a queue group of the UE defined in the HARQ parameter.

Still as shown in the figure, this embodiment further includes a synchronizing unit 24. The sending unit 22 may be further configured to: after the UE is handed over from the base station and accesses a target base station, report status information of a downlink HARQ process to the target base station; the receiving unit 21 may be further configured to receive status information of the uplink HARQ process sent by the target base station, and send the status information of the uplink HARQ process to the synchronizing unit 24; and the synchronizing unit 24 performs uplink HARQ process synchronization with the target base station according to the status information of the uplink HARQ process.

The sending unit 22 is further configured to send the uplink transmitted data to the base station by using the first uplink transmission resource.

Optionally, the uplink data includes a ciphered MAC PDU; the sending unit 22 may be specifically configured to send, by using a MAC layer of the UE, the ciphered MAC PDU to the base station by using the first uplink transmission resource; the MAC layer of the UE is configured to perform header compression processing on user plane data received from a non-access stratum, and store the header-compressed data to a to-be-sent buffer of a corresponding queue; or receive a PDCP PDU from a PDCP entity of the UE, and store the PDCP PDU to a to-be-sent buffer of a corresponding queue; the MAC layer of the UE determines, according to a scheduling operation, a scheduled queue in the corresponding queues and a data amount corresponding to the queue, and performs concatenation or segmentation processing on data in the queue according to the data amount; and performs multiplexing processing on the data after concatenation or segmentation processing to obtain a MAC PDU, and performs ciphering processing to obtain the ciphered MAC PDU.

Alternatively, the uplink data includes a ciphered MAC PDU; the sending unit 22 is specifically configured to send, by using a MAC layer of the UE, the ciphered MAC PDU to the base station according to the first uplink transmission resource; a sending RLC entity at an RLC layer of the UE receives a data packet sent by a PDCP layer, assembles the data packet into a MAC data packet of a size indicated by the MAC layer, encapsulates an RLC header into the MAC data packet, and therefore forms an RLC PDU, and sends the RLC PDU to the MAC layer of the UE; and the MAC layer of the UE is configured to perform multiplexing processing on the RLC PDU to obtain a MAC PDU, and perform ciphering processing to obtain the ciphered MAC PDU.

The UE according to this embodiment of the present invention uses a simplified protocol stack, which reduces complexity of the protocol stack, reduces an overhead, and improves the processing efficiency and transmission efficiency.

Figure 24:
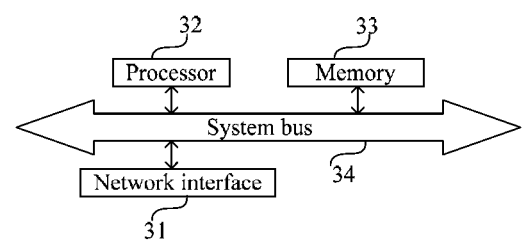
FIG. 24 is a schematic diagram of Embodiment 1 of a scheduling system according to the present invention.

FIG. 24 is a schematic diagram of Embodiment 1 of a scheduling system according to the present invention. As shown in the figure, this embodiment specifically includes a network interface 31, a processor 32, and a memory 33. A system bus 34 is configured to connect the network interface 31, the processor 32, and the memory 33.

The network interface 31 is configured to communicate with a UE. The memory 33 may be a persistent memory, for example, a hard disk drive and a flash memory. The memory 33 has software modules and device drivers. The software modules are various functional modules that can execute the method of the present invention; and the device drivers may be network and interface drivers.

When being started, these software components are loaded into the memory 33, and then are accessed by the processor 32 to execute the following instructions:

configuring, by a base station, a HARQ parameter for a UE according to a quality of service QoS requirement;

sending, by the base station, the HARQ parameter to the UE;

receiving, by the base station, a BSR that is sent by the UE according to the HARQ parameter;

allocating, by the base station, a first uplink transmission resource to the UE according to the BSR, and scheduling the first uplink transmission resource for the UE; and receiving, by the base station, uplink transmitted data that is sent by the UE by using the first uplink transmission resource.

Further, an instruction of an application program that may be used for the configuring, by a base station, a HARQ parameter for a UE according to a quality of service QoS requirement, is: configuring, by the base station, the HARQ parameter for a queue of the UE according to a reliability requirement in the QoS requirement; the HARQ parameter includes a maximum number of HARQ transmissions, or includes an uplink HARQ process number used by the queue of the UE and a maximum number of HARQ transmissions; and the scheduling the first uplink transmission resource for the UE is: notifying, by the base station by using a PDCCH indication, the UE of the first uplink transmission resource allocated to the queue of the UE.

Alternatively, further, an instruction of an application program that may be used for the configuring, by a base station, a HARQ parameter for a UE according to a quality of service QoS requirement, is: configuring, by the base station, the HARQ parameter for a queue group of the UE according to a reliability requirement in the QoS requirement; the HARQ parameter includes a maximum number of HARQ transmissions, or includes a maximum number of HARQ transmissions and an uplink HARQ process number used by the queue group of the UE; and the scheduling the first uplink transmission resource for the UE is: notifying, by the base station by using a PDCCH indication, the UE of the first uplink transmission resource allocated to the queue group of the UE.

Alternatively, further, an instruction of an application program that may be used for the configuring, by a base station, a HARQ parameter for a UE according to a quality of service QoS requirement, is: configuring, by the base station, the HARQ parameter for an uplink HARQ process of the UE according to a reliability requirement in the QoS requirement; the HARQ parameter includes a maximum number of retransmissions of the uplink HARQ process, or includes a maximum number of retransmissions of the uplink HARQ process and a number of a queue or a queue group of the UE, where the queue or queue group uses the uplink HARQ process; and the scheduling the first uplink transmission resource for the UE is: notifying, by the base station by using a PDCCH indication, the UE of the first uplink transmission resource allocated to the uplink HARQ process.

Further, the receiving, by the base station, a BSR that is sent by the UE according to the HARQ parameter, is: receiving, by the base station, the BSR that is sent by the UE according to a unit of a queue, or a queue group, or a queue and a queue group of the UE defined in the HARQ parameter.

Further, after the processor accesses the software components in the memory 33, instructions of the following procedure are executed:

when the UE is handed over from the base station to a target base station, sending, by the base station, information in the uplink HARQ process and information in a downlink HARQ process to the target base station;

after the UE accesses the target base station, receiving, by the target base station, status information of the downlink HARQ process reported by the UE;

sending, by the target base station, status information of the uplink HARQ process to the UE; and performing, by the target base station, downlink HARQ process synchronization with the UE according to the status information of the downlink HARQ process.

In addition, the receiving, by the base station, uplink transmitted data that is sent by the UE by using the first uplink transmission resource, is: receiving, by a MAC layer of the base station, a ciphered MAC PDU that is sent by the UE by using the first uplink transmission resource; and further, after the processor accesses 63:

The application program further includes instructions that may be used to cause the processor and the system to execute the following procedure:

performing, by the MAC layer of the base station, deciphering processing on the ciphered MAC PDU to obtain the MAC PDU; performing reordering processing on the MAC PDU; performing MAC header removal processing on the reordered MAC PDU, and then performing SDU reassembly to generate a MAC SDU; and sending the MAC SDU to a non-access stratum of the base station; or performing, by the MAC layer of the base station, deciphering processing on the ciphered MAC PDU to obtain the deciphered MAC PDU; performing reordering processing on the MAC PDU; performing MAC header removal processing on the reordered MAC PDU to obtain a MAC SDU, where the MAC SDU includes an RLC PDU; sending the RLC PDU to a receiving RLC entity at an RLC layer of the base station according to an indication of a queue number of the RLC PDU, where the indication is carried in the MAC header; performing, by the receiving RLC entity, RLC Header removal processing on the RLC PDU, and then performing disassembly or assembly processing to restore the RLC PDU to an RLC SDU; and sending the RLC SDU to a PDCP layer of the base station.

Figure 25:
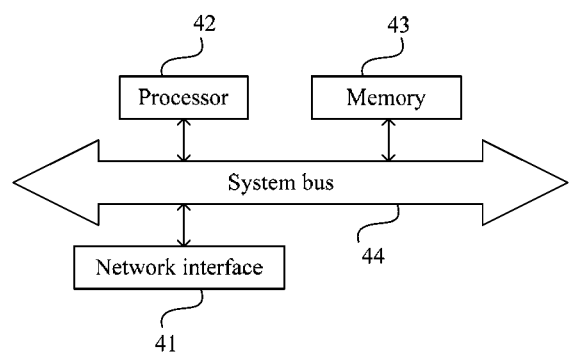
FIG. 25 is a schematic diagram of Embodiment 2 of a scheduling system according to the present invention.

FIG. 25 is a schematic diagram of Embodiment 2 of a scheduling system according to the present invention. As shown in the figure, the scheduling system specifically includes a network interface 41, a processor 42, and a memory 43. A system bus 44 is configured to connect the network interface 41, the processor 42, and the memory 43.

The network interface 41 is configured to communicate with a base station. The memory 43 may be a persistent memory, for example, a hard disk drive and a flash memory. The memory 43 has software modules and device drivers. The software modules are various functional modules that can execute the method of the present invention; and the device drivers may be network and interface drivers.

When being started, these software components are loaded into the memory 43, and then are accessed by the processor 42 to execute the following instructions:

receiving, by a UE, a HARQ parameter that is configured by a base station according to a QoS requirement;

sending, by the UE, a BSR to the base station according to the HARQ parameter;

receiving, by the UE, an indication of a first uplink transmission resource that is allocated to the UE and scheduled by the base station;

determining, by the UE, a scheduled queue according to the indication, and scheduling uplink transmitted data in the queue; and sending, by the UE, the uplink transmitted data to the base station by using the first uplink transmission resource.

Further, an instruction of an application program that may be used for the receiving, by a UE, a HARQ parameter that is configured by a base station according to a QoS requirement, is: receiving the HARQ parameter that is configured by the base station for the queue of the UE according to a reliability requirement in the QoS requirement; the HARQ parameter includes a maximum number of HARQ transmissions, or includes an uplink HARQ process number used by the queue of the UE and a maximum number of HARQ transmissions; and the receiving, by the UE, an indication of a first uplink transmission resource that is allocated to the UE and scheduled by the base station, is: receiving a notification of the first uplink transmission resource allocated to the queue of the UE, where the notification is sent by the base station to the UE by using a PDCCH indication.

Alternatively, further, an instruction of an application program that may be used for the receiving, by a UE, a HARQ parameter that is configured by a base station according to a QoS requirement, is: receiving the HARQ parameter that is configured by the base station for a queue group of the UE according to a reliability requirement in the QoS requirement; the HARQ parameter includes a maximum number of HARQ transmissions, or includes a maximum number of HARQ transmissions and an uplink HARQ process number used by the queue group of the UE; and the receiving, by the UE, an indication of a first uplink transmission resource that is allocated to the UE and scheduled by the base station, is: receiving a notification of the first uplink transmission resource allocated to the queue group of the UE, where the notification is sent by the base station to the UE by using a PDCCH indication.

Alternatively, further, an instruction of an application program that may be used for the receiving, by a UE, a HARQ parameter that is configured by a base station according to a QoS requirement, is: receiving the HARQ parameter that is configured by the base station for an uplink HARQ process of the UE according to a reliability requirement in the QoS requirement; the HARQ parameter includes a maximum number of retransmissions of the uplink HARQ process, or includes a maximum number of retransmissions of the uplink HARQ process and a number of a queue or a queue group of the UE, where the queue or queue group uses the uplink HARQ process; and the receiving, by the UE, an indication of a first uplink transmission resource that is allocated to the UE and scheduled by the base station, is: receiving a notification of the first uplink transmission resource allocated to the uplink HARQ process, where the notification is sent by the base station to the UE by using a PDCCH indication.

Further, the sending, by the UE, a BSR to the base station according to the HARQ parameter, is: sending, by the UE, the BSR to the base station according to a unit of a queue, or a queue group, or a queue and a queue group of the UE defined in the HARQ parameter.

Further, after the processor accesses the software components in the memory 43, instructions of the following procedure are executed: after the UE is handed over from the base station and accesses a target base station, reporting status information of a downlink HARQ process to the target base station;

receiving status information of the uplink HARQ process sent by the target base station; and performing, by the UE, uplink HARQ process synchronization with the target base station according to the status information of the uplink HARQ process.

Further, the sending, by the UE, the uplink transmitted data to the base station by using the first uplink transmission resource, is: sending, by a MAC layer of the UE, a ciphered MAC PDU to the base station by using the first uplink transmission resource:

The application program further includes instructions that may be used to cause the processor and the system to execute the following procedure:

performing, by the MAC layer of the UE, header compression processing on user plane data received from a non-access stratum, and storing the header-compressed data to a to-be-sent buffer of a corresponding queue; or receiving, by the MAC layer of the UE, a PDCP PDU from a PDCP entity of the UE, and storing the PDCP PDU to a to-be-sent buffer of a corresponding queue, where the PDCP entity is corresponding to the queue; determining, by the MAC layer of the UE according to a scheduling operation, a scheduled queue in the corresponding queues and a data amount corresponding to the queue, and performing concatenation or segmentation processing on data in the queue according to the data amount; and performing multiplexing processing on the data after concatenation or segmentation processing to obtain a MAC PDU, and performing ciphering processing to obtain the ciphered MAC PDU; or receiving, by a sending RLC entity at an RLC layer of the UE, a data packet sent by a PDCP layer; assembling the data packet into a MAC data packet of a size indicated by the MAC layer; encapsulating an RLC header into the MAC data packet, and thereby forming an RLC PDU, and sending the RLC PDU to the MAC layer of the UE; and performing, by the MAC layer of the UE, multiplexing processing on the RLC PDU to obtain a MAC PDU, and performing ciphering processing to obtain the ciphered MAC PDU.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A scheduling method comprising:
configuring, by a base station, a hybrid automatic repeat request (HARQ) parameter for a user equipment (UE) according to a quality of service (QoS) requirement;
sending, by the base station, the HARQ parameter to the UE;
receiving, by the base station, a buffer status report (BSR) that is sent by the UE according to the HARQ parameter;
allocating, by the base station, a first uplink transmission resource to the UE according to the BSR, and scheduling the first uplink transmission resource for the UE;
receiving, by a Medium Access Control (MAC) layer of the base station, uplink transmitted data comprising a ciphered MAC Protocol Data Unit (PDU) that is sent by the UE using the first uplink transmission resource; and
wherein the ciphered MAC PDU is obtained from the UE by ciphering processing on a MAC PDU, which is obtained by multiplexing processing on data in a queue after concatenation or segmentation; wherein the data in the queue is header-compressed user plane data received from a non-access stratum and stored in a to-be-sent buffer of a corresponding queue, and the data in the queue is determined according to a scheduled queue in the corresponding queue and a data amount corresponding to the scheduled queue based on a scheduling operation.

2. The method according to claim 1, wherein configuring the HARQ parameter for the UE according to the QoS requirement, comprises: configuring, by the base station, the HARQ parameter for a queue of the UE according to a reliability requirement in the QoS requirement.

3. The method according to claim 2, wherein the HARQ parameter comprises a maximum number of HARQ transmissions, or comprises an uplink HARQ process number used by the queue of the UE and a maximum number of HARQ transmissions.

4. The method according to claim 1,
wherein the method further comprises: performing, by the MAC layer of the base station, deciphering processing on the ciphered MAC PDU to obtain the MAC PDU;
performing reordering processing on the MAC PDU;
performing MAC header removal processing on the reordered MAC PDU, and then performing service data unit (SDU) reassembly to generate a MAC SDU; and
sending the MAC SDU to a non-access stratum of the base station.

5. A scheduling method, comprising:
receiving, by a user equipment (UE), a hybrid automatic repeat request (HARQ) parameter that is configured by a base station according to a quality of service (QoS) requirement;
sending, by the UE, a buffer status report (BSR) to the base station according to the HARQ parameter;
receiving, by the UE, an indication of a first uplink transmission resource that is allocated to the UE and scheduled by the base station;
determining, by the UE, a scheduled queue according to the indication, and scheduling uplink transmitted data comprising a ciphered Medium Access Control (MAC) Protocol Data Unit (PDU) in the queue, wherein the ciphered MAC PDU is obtained by an MAC layer of the UE through the following:
performing, by the MAC layer of the UE, header compression processing on user plane data received from a non-access stratum, and storing the header-compressed data to a to-be-sent buffer of a corresponding queue;
determining, by the MAC layer of the UE according to a scheduling operation, a scheduled queue in the corresponding queues and a data amount corresponding to the queue, and performing concatenation or segmentation processing on data in the queue according to the data amount; and
performing multiplexing processing on the data after concatenation or segmentation processing to obtain a MAC PDU, and performing ciphering processing to obtain the ciphered MAC PDU; and
sending, by the MAC layer of the UE, the uplink transmitted data to the base station using the first uplink transmission resource.

6. The method according to claim 5, wherein receiving the HARQ parameter that is configured by the base station according to the QoS requirement, comprises:
receiving the HARQ parameter that is configured by the base station for the queue of the UE according to a reliability requirement in the QoS requirement.

7. The method according to claim 6, wherein the HARQ parameter comprises a maximum number of HARQ transmissions, or comprises an uplink HARQ process number used by the queue of the UE and a maximum number of HARQ transmissions.

8. The method according to claim 5, wherein before determining the scheduled queue and the data amount, instead of performing the header compression processing and storing the header-compressed data, the method comprises: receiving, by the MAC layer of the UE, a packet data convergence protocol (PDCP) PDU from a PDCP entity of the UE, and storing the PDCP PDU to the to-be-sent buffer of the corresponding queue.

9. A base station, wherein the base station comprises a processor, a memory which is coupled to the processor, and a Medium Access Control (MAC) layer, wherein the memory stores processor-executable instructions which when executed by the processor causes the processor to implement operations including:
configuring a Hybrid Automatic Repeat Request (HARQ) parameter for a user equipment (UE) according to a quality of service (QoS) requirement;
sending the HARQ parameter to the UE;
receiving a buffer status report (BSR) that is sent by the UE according to the HARQ parameter;
allocating a first uplink transmission resource to the UE according to the BSR, and scheduling the first uplink transmission resource for the UE; and
receiving uplink transmitted data through the MAC layer of the base station, wherein the uplink transmitted data comprises a ciphered MAC Protocol Data Unit (PDU) and is sent by the UE using the first uplink transmission resource;
wherein the ciphered MAC PDU is obtained from the UE by ciphering processing on a MAC PDU, which is obtained by multiplexing processing on data in a queue after concatenation or segmentation; wherein the data in the queue is header-compressed user plane data received from a non-access stratum and stored in a to-be-sent buffer of a corresponding queue, and the data in the queue is determined according to a scheduled queue in the corresponding queue and a data amount corresponding to the scheduled queue based on a scheduling operation.

10. The base station according to claim 9, wherein the operations comprise:
configuring the HARQ parameter for a queue of the UE according to a reliability requirement in the QoS requirement;
the HARQ parameter comprises a maximum number of HARQ transmissions, or comprises an uplink HARQ process number used by the queue of the UE and a maximum number of HARQ transmissions; and
notifying, by using a Physical Downlink Control Channel (PDCCH) indication, the UE of the first uplink transmission resource allocated to the queue of the UE.

11. The base station according to claim 9, wherein the operations comprise:
configuring the HARQ parameter for a queue group of the UE according to a reliability requirement in the QoS requirement; the HARQ parameter comprises a maximum number of HARQ transmissions, or comprises a maximum number of HARQ transmissions and an uplink HARQ process number used by the queue group of the UE; and
notifying, by using a Physical Downlink Control Channel (PDCCH) indication, the UE of the first uplink transmission resource allocated to the queue group of the UE.

12. The base station according to claim 9, wherein the MAC layer of the base station is configured to:
perform, deciphering processing on the ciphered MAC PDU to obtain the MAC PDU;
perform reordering processing on the MAC PDU;
perform MAC header removal processing on the reordered MAC PDU, and then performing service data unit (SDU) reassembly to generate a MAC SDU; and
send the MAC SDU to a non-access stratum of the base station.

13. A user equipment (UE), wherein the UE comprises a processor, a memory which is coupled to the processor, and a Medium Access Control (MAC) layer, wherein the memory stores processor-executable instructions which when executed by the processor causes the processor to implement operations including:
receiving a hybrid automatic repeat request (HARQ) parameter that is configured by a base station according to a quality of service (QoS) requirement;
sending a buffer status report BSR to the base station according to the HARQ parameter;
receiving an indication of a first uplink transmission resource that is allocated to the UE and scheduled by the base station;
determining a scheduled queue according to the indication, schedule uplink transmitted data comprising a ciphered MAC Protocol Data Unit (PDU) in the queue; and
sending the uplink transmitted data through the MAC layer of the UE to the base station using the first uplink transmission resource;
wherein the MAC layer of the UE is configured to obtain the ciphered MAC PDU, by implementing the following:

performing, header compression processing on user plane data received from a non-access stratum, and store the header-compressed data to a to-be-sent buffer of a corresponding queue;
determining according to a scheduling operation, a scheduled queue in the corresponding queues and a data amount corresponding to the queue, and performing concatenation or segmentation processing on data in the queue according to the data amount; and
performing multiplexing processing on the data after concatenation or segmentation processing to obtain a MAC PDU, and perform ciphering processing to obtain the ciphered MAC PDU.

14. The UE according to claim 13, wherein the operations comprise:
receiving the HARQ parameter that is configured by the base station for the queue of the UE according to a reliability requirement in the QoS requirement;
the HARQ parameter comprises a maximum number of HARQ transmissions, or comprises an uplink HARQ process number used by the queue of the UE and a maximum number of HARQ transmissions; and
receiving a notification of the first uplink transmission resource allocated to the queue of the UE, wherein the notification is sent by the base station to the UE using a Physical Downlink Control Channel (PDCCH) indication.

15. The user equipment according to claim 13, wherein before determining the scheduled queue and the data amount, instead of performing the header compression processing and storing the header-compressed data, the MAC layer of the UE is configured to:
receive, a packet data convergence protocol (PDCP) PDU from a PDCP entity of the UE, and storing the PDCP PDU to the to-be-sent buffer of the corresponding queue.

16. A scheduling system, comprising:
a network interface;
a processor;
a memory; and
an application program physically stored in the memory, wherein the application program comprises instructions that cause the processor and the system to execute the following:
configuring, a hybrid automatic repeat request (HARQ) parameter for a user equipment (UE) according to a quality of service (QoS) requirement;
sending, the HARQ parameter to the UE;
receiving, a buffer status report (BSR) that is sent by the UE according to the HARQ parameter;
allocating, a first uplink transmission resource to the UE according to the BSR, and scheduling the first uplink transmission resource for the UE; and
receiving, through a Medium Access Control (MAC) layer of the scheduling system, uplink transmitted data comprising a ciphered MAC Protocol Data Unit (PDU) that is sent by the UE using the first uplink transmission resource;
wherein the ciphered MAC PDU is obtained from the UE by ciphering processing on a MAC PDU, which is obtained by multiplexing processing on data in a queue after concatenation or segmentation: wherein the data in the queue is header-compressed user plane data received from a non-access stratum and stored in a to-be-sent buffer of a corresponding queue, and the data in the queue is determined according to a scheduled queue in the corresponding queue and a data amount corresponding to the scheduled queue based on a scheduling operation.

17. The system according to claim 16, wherein:
configuring the HARQ parameter for the UE according to the QoS requirement, comprises:
configuring, the HARQ parameter for a queue of the UE according to a reliability requirement in the QoS requirement; wherein the HARQ parameter comprises a maximum number of HARQ transmissions, or comprises an uplink HARQ process number used by the queue of the UE and a maximum number of HARQ transmissions; and
wherein scheduling the first uplink transmission resource for the UE comprises: notifying, by using a Physical Downlink Control Channel (PDCCH) indication, the UE of the first uplink transmission resource allocated to the queue of the UE.

18. The system according to claim 16, wherein configuring the HARQ parameter for the UE according to the QoS requirement, comprises: configuring, the HARQ parameter for a queue group of the UE according to a reliability requirement in the QoS requirement;
wherein the HARQ parameter comprises a maximum number of HARQ transmissions, or comprises a maximum number of HARQ transmissions and an uplink HARQ process number used by the queue group of the UE; and
wherein scheduling the first uplink transmission resource for the UE comprises:
notifying, by using a Physical Downlink Control Channel (PDCCH) indication, the UE of the first uplink transmission resource allocated to the queue group of the UE.

19. The system according to claim 16, wherein configuring the HARQ parameter for the UE according to the QoS requirement, comprises:
configuring, the HARQ parameter for an uplink HARQ process of the UE according to a reliability requirement in the QoS requirement;
the HARQ parameter comprises a maximum number of retransmissions of the uplink HARQ process, or comprises a maximum number of retransmissions of the uplink HARQ process and a number of a queue or a queue group of the UE, wherein the queue or queue group uses the uplink HARQ process; and wherein scheduling the first uplink transmission resource for the UE comprising:
notifying, by using a Physical Downlink Control Channel (PDCCH) indication, the UE of the first uplink transmission resource allocated to the uplink HARQ process.

20. A scheduling system, comprising:
a network interface;
a processor;
a memory; and
an application program physically stored in the memory, wherein the application program comprises instructions that cause the processor and the system to execute the following:
receiving, a hybrid automatic repeat request (HARQ) parameter that is configured by a base station according to a quality of service (QoS) requirement;
sending, a buffer status report (BSR) to the base station according to the HARQ parameter;
receiving, an indication of a first uplink transmission resource that is allocated to the UE and scheduled by the base station;
determining a scheduled queue according to the indication, and scheduling uplink transmitted data comprising a ciphered Medium Access Control (MAC) Protocol Data Unit (PDU) in the queue, wherein the ciphered MAC PDU is obtained by an MAC layer of the UE through the following:
performing, by the MAC layer of the UE, header compression processing on user plane data received from a non-access stratum, and storing the header-compressed data to a to-be-sent buffer of a corresponding queue;
determining, by the MAC layer of the UE according to a scheduling operation, a scheduled queue in the corresponding queues and a data amount corresponding to the queue, and performing concatenation or segmentation processing on data in the queue according to the data amount;
performing multiplexing processing on the data after concatenation or segmentation processing to obtain a MAC PDU, and performing ciphering processing to obtain the ciphered MAC PDU; and
sending the uplink transmitted data through the MAC layer of the scheduling system to the base station using the first uplink transmission resource.

* * * * *